(12) United States Patent
Izdepski et al.

(10) Patent No.: US 8,190,672 B2
(45) Date of Patent: *May 29, 2012

(54) APPARATUS AND METHOD FOR SENDING A WEB LOGGING MESSAGE TO A DISPATCH COMMUNICATION DEVICE

(75) Inventors: Erich Joseph Izdepski, Falls Church, VA (US); Ojas Thakor Choksi, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 1902 days.

This patent is subject to a terminal disclaimer.

(21) Appl. No.: 11/086,531

(22) Filed: Mar. 21, 2005

(65) Prior Publication Data
US 2006/0184611 A1  Aug. 17, 2006

Related U.S. Application Data

(60) Provisional application No. 60/653,683, filed on Feb. 16, 2005.

(51) Int. Cl.
*G06F 15/16* (2006.01)
*H04M 3/42* (2006.01)
*H04W 4/00* (2009.01)

(52) U.S. Cl. ........ 709/203; 709/200; 709/219; 709/227; 709/229; 707/3; 455/414.2; 455/466

(58) Field of Classification Search .................. 709/200, 709/219, 227, 229; 707/3; 455/414.2, 466
See application file for complete search history.

(56) References Cited

U.S. PATENT DOCUMENTS

| | | | |
|---|---|---|---|
| 6,601,026 B2 * | 7/2003 | Appelt et al. ...................... 704/9 |
| 6,880,010 B1 * | 4/2005 | Webb et al. .................... 709/227 |
| 7,069,003 B2 * | 6/2006 | Lehikoinen et al. ........ 455/414.2 |
| 7,092,728 B1 * | 8/2006 | Gress et al. .................... 455/466 |
| 7,194,546 B2 * | 3/2007 | Kameoka et al. ............. 709/229 |
| 7,236,580 B1 * | 6/2007 | Sarkar et al. ............. 379/202.01 |
| 2003/0206192 A1 * | 11/2003 | Chen et al. .................... 345/733 |
| 2004/0260820 A1 * | 12/2004 | Bearman ...................... 709/229 |
| 2005/0064852 A1 * | 3/2005 | Baldursson ................ 455/414.2 |
| 2006/0004914 A1 * | 1/2006 | Kelly et al. .................... 709/219 |
| 2006/0056361 A1 * | 3/2006 | Jiang et al. .................... 370/335 |
| 2006/0282408 A1 * | 12/2006 | Wisely et al. ...................... 707/3 |

* cited by examiner

*Primary Examiner* — Philip Lee

(57) ABSTRACT

A system for posting web logging (blog) messages, retrieving blog messages, and being notified of the posting of blog messages by way of dispatch communications. The system includes a wireless communication system capable of setting up dispatch communications links between subscriber units and a dispatch server. The dispatch server interfaces with a blog server. Using dispatch communications, subscriber units may send messages to the blog server for posting by way of the dispatch server, may receive notification of the posting of messages from the blog server by way of the dispatch server, and may retrieve messages from the blog server by way of the dispatch server.

24 Claims, 22 Drawing Sheets

APPARATUS AND METHOD FOR SENDING A WEB LOGGING MESSAGE TO A DISPATCH COMMUNICATION DEVICE

CROSS-REFERENCE TO RELATED APPLICATION

This application claims the benefit of the Provisional Application Ser. No. 60/653,683, filed on Feb. 16, 2005 and entitled "Wireless Communication System and Method of Providing Dispatch to a Blog Server", which is incorporated herein by reference.

FIELD OF THE INVENTION

This invention relates generally to wireless communication systems, and in particular, to a wireless communication system and method of providing dispatch communications to a web logging ("blog") server.

BACKGROUND OF THE INVENTION

Wireless communication systems have become increasingly popular over the last decade. These systems allow subscribers to communicate with other parties while being geographically mobile. Further, these systems allow subscribers to communicate with other parties in various communication modes. For example, some systems allow subscribers to communicate with other parties by way of a full-duplex voice communication link, where the link is allocated to all parties for transmitting and receiving voice communications (e.g., a cellular communication link). Other systems allow users to communicate with other parties by way of a half-duplex voice communication link, where the link is allocated to a single party at a particular time for transmitting voice communication (e.g., a dispatch communication link).

In addition to providing different modes of communication, wireless communication systems allow subscribers to communicate with entities outside of their respective systems. For instance, subscribers are able to access an external network, such as the Internet, to provide and obtain information to and from entities connected to the external network. Such entities may include webpage servers, email servers, other wireless communication systems, etc.

Of particular interest is the external entity of a web logging server, or otherwise known as a "blog" server. Blog servers allow users to post messages on personal webpages which are accessible to the public or a restricted number of users by way of the Internet. Other users accesses other parties blog webpages to view messages posted by the owners of the blog. The messages are in text form. Thus, to access a message, a user typically uses a device with a display (e.g., a desktop computer) to view the message on the display. In addition, because the messages are in text form, the owner of the blog has to type the message and then upload the message to the blog server.

A drawback of the blog message accessing and posting described above is that a user must be generally stationary to operate a computer in order to access messages from and post messages to a blog webpage. Other more portable devices, such as personal digital assistants (PDAs), allow a user to be more mobile. However, they still require a user to read and type the text messages, which is inconvenient or impossible in certain situations, such as when a person is driving a car.

SUMMARY OF THE INVENTION

An aspect of the invention relates to a system comprising a web logging ("blog") server and a dispatch server. The dispatch server is adapted to receive a dispatch multimedia communication from a subscriber unit containing a message by way of a wireless communication system, and send the message to the blog server for posting on a webpage. The message may be in the form of a text, audio, image, and/or video. The dispatch server may be further adapted to generate a text, audio, image and/or video file of the message from the dispatch multimedia communication, and send the file to the blog server for posting. In addition, if the message is received as an audio, the dispatch server may have the audio file converted into a text file by a speech-to-text server, and then send the text file to the blog server for posting.

Another aspect of the invention relates to a system comprising a blog server adapted to generate a notification after receiving a message to be posted on a webpage; and a dispatch server adapted to receive the notification from the blog server, and send a dispatch communication containing the notification to a subscriber unit by way of a wireless communication system. The dispatch communication may be a call alert or a dispatch multimedia communication containing a text, audio, image and/or video file of the message. The dispatch server may receive the notification in any type of multimedia format, such as a text, audio, image and/or video. If the dispatch server receives the notification as a text file, it may have it converted into an audio file by a text-to-speech server. The blog server may provide such notification to only registered subscriber units.

Another aspect of the invention relates to a system comprising a blog server including a message posted on a webpage; and a dispatch server adapted to receive a request from a subscriber unit for the message by way of a wireless communication system, forward the request to the blog server, receive the requested message from the blog server, and send the message to the subscriber unit by way of a dispatch multimedia communication via the wireless communication system. The dispatch server may receive the message in any multimedia format, such as a text, audio, image and/or video. The request from the subscriber unit may be received by the dispatch server as a call alert or a dispatch multimedia communication. If the request is received as a dispatch multimedia communication, the dispatch server may be adapted to convert the multimedia communication into an audio file, and send the audio file to the blog server. In addition, the dispatch server may have the audio file converted into a text file by a speech-to-text server, and then send the text file to the blog server. The dispatch server may receive the message from the blog server in any type of multimedia format, such as such as a text, audio, image and/or video. If it receives the message as a text file, the dispatch server may have a text-to-speech server convert it into an audio file.

Another aspect of the invention relates to a dispatch server comprising a network interface; and a processor adapted to receive a dispatch multimedia communication by way of the network interface, wherein the dispatch multimedia communication includes a message to be posted on a blog webpage, and send the message to the blog server for posting by way of the network interface. The processor may be adapted to convert the message into an audio file, have the audio file converted into a text file by a speech-to-text server, and send the text file to a blog server for posting by way of the network interface. A method and software module related to the operation of the dispatch server are also disclosed.

Another aspect of the invention relates to a dispatch server comprising a network interface; and a processor adapted to receive a notification from a blog server by way of the network interface indicating that a message has been recently posted on a blog webpage, and send a dispatch communication including the notification to a subscriber unit by way of the network interface. The dispatch communication may be a call alert or a dispatch multimedia communication containing a text, audio, image and/or video representation of the notification. The processor may be adapted to receive the notification as a text file, have the text file converted into an audio file by a text-to-speech server, and send the corresponding audio to the subscriber unit via a dispatch multimedia communication. Such notification may be sent to only registered subscribers, which the dispatch server may assist in the registration process. A method and software module related to the operation of the dispatch server are also disclosed.

Another aspect of the invention relates to a dispatch server comprising a network interface; and a processor adapted to receive a request for a message posted on a blog webpage from a subscriber unit by way of the network interface, forward the request to a blog server by way of the network interface; receive the message from the blog server by way of the network interface; and send a dispatch multimedia communication containing the message to the subscriber unit by way of the network interface. The request received from the subscriber unit may be in the form of a call alert or any type of dispatch multimedia communication. The processor may be further adapted to convert the dispatch multimedia communication into an audio file, have the audio file converted into a text file by a speech-to-text server, and send the text file to the blog server by way of the network interface. The processor may be further adapted to receive the message in a text, audio, image, and/or video format. If it receives it as a text file, it may send it to a text-to-speech server for conversion into an audio file. A method and software module related to the operation of the dispatch server are also disclosed.

Another aspect of the invention relates to a blog server, comprising a network interface; and a processor adapted to receive a message in any type of multimedia format, determine a webpage to post the message, and post the message on the webpage. The message may include an identifier associated with the web page, and wherein the processor is adapted to determine the webpage using the identifier. A method and software module related to the operation of the blog server are also disclosed.

Another aspect of the invention relates to a blog server comprising a network interface; and a processor adapted to receive a message to be posted on a webpage by way of the network interface, post the message on the webpage, and send a notification of the posting of the message to a subscriber unit by way of the network interface. The processor may be adapted to receive an acknowledgement of the receipt of the notification by way of the network interface. The processor may also be adapted to register subscriber units to which automatic notifications of the posting of messages are sent. A method and software module related to the operation of the blog server are also disclosed.

Another aspect of the invention relates to a blog server comprising a network interface; and a processor adapted to receive a request from a requesting entity by way of the network interface for a message in any type of multimedia format posted on a webpage, access the message, and send the message to the requesting entity by way of the network interface. A method and software module related to the operation of the blog server are also disclosed.

Another aspect of the invention relates to a subscriber unit comprising an interface and a processor. The processor is adapted to receive a dispatch communication including a notification of the posting of a message on a blog webpage by way of the interface; and inform a user of the subscriber unit of the notification. The processor may be further adapted to send a subscription request to a wireless communication system by way of the interface, wherein the subscription request is for receiving blog services, such as the automatic receiving of notifications of the posting of messages on a blog webpage; and receive a subscription response message from the wireless communication system by way of the network interface. The dispatch communication containing the notification may be a call alert or any type of dispatch multimedia communication. The subscriber unit may include a speaker, display, and/or other device used to inform the user. The interface may be an RF interface or a network interface. A method and software module related to the operation of the subscriber unit are also disclosed.

Another aspect of the invention relates to a subscriber unit comprising an interface and a processor. The processor is adapted to send a dispatch communication to a wireless communication system by way of the interface, wherein the dispatch communication serves as a request for a message posted on a blog webpage; and receive a dispatch multimedia communication including the message from the wireless communication system by way of the interface. The dispatch communication may be a call alert or any type of dispatch multimedia communication. The interface may be an RF interface or a network interface. A method and software module related to the operation of the subscriber unit are also disclosed.

Another aspect of the invention relates to a subscriber unit comprising an interface; and a processor to send a dispatch communication to a wireless communication system by way of the interface, wherein the dispatch communication comprises a message to be posted on a web logging webpage. The message may be in text, audio, image and/or video format. The processor may be further adapted to send the dispatch communication to a dispatch server by way of the wireless communication system. In addition, the processor may be adapted to assist in the setup and termination of a dispatch communication link to the dispatch server through which the dispatch communication sent. In the setup of the dispatch communication link, the processor may be adapted to send a call request message that includes information which indicates to the dispatch server that the dispatch communication link is for the posting of a message on the web logging webpage. A method and software module related to the operation of the subscriber unit are also disclosed.

Other aspects, features, and techniques of the invention will be apparent to one skilled in the relevant art in view of the following detailed description of the exemplary embodiments of the invention.

DETAILED DESCRIPTION OF THE PREFERRED EMBODIMENTS

Figure 1:
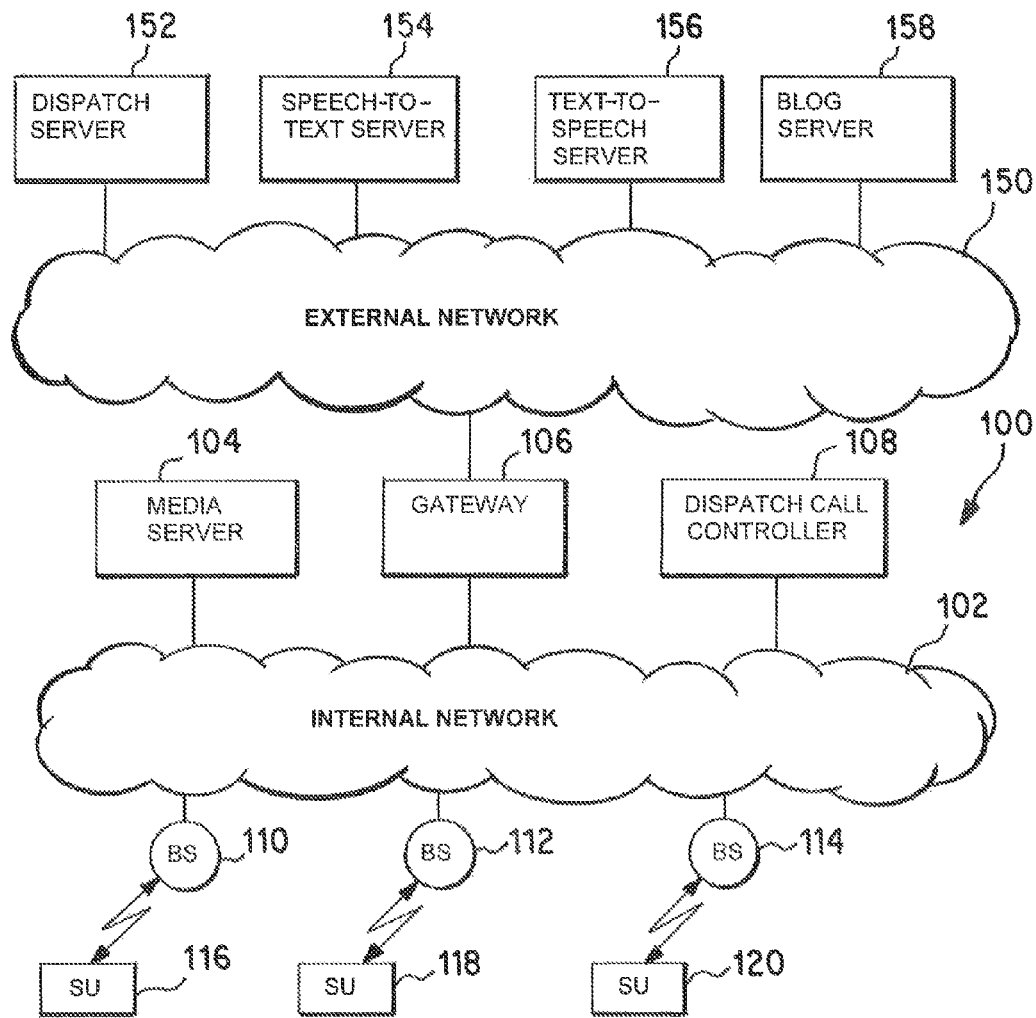
FIG. 1 illustrates a block diagram of an exemplary wireless communication system in accordance with an embodiment of the invention.

FIG. 1 illustrates a block diagram of an exemplary wireless communication system 100 in accordance with an embodiment of the invention. The wireless communication system 100 provides subscribers the capability of posting messages on web logging ("blog") webpages by way of dispatch communications, the capability of receiving notification of the posting of new messages on blog webpages by way of dispatch communications, and the capability of receiving posted blog messages by way of dispatch communications. The wireless communication system 100 comprises an internal network 102, a media server 104, a gateway 106, a dispatch call controller 108, and a plurality of base stations 110, 112, and 114. The wireless communication system 100 serves a plurality of subscriber units (SUs) 116, 118, and 120.

The media server 104 generates dispatch packets for transmission through the internal network 102. The gateway 106 provides an interface between the internal network 102 and an external network 150. The dispatch call controller 108 assists in setting up dispatch calls, controls dispatch communications between parties, and assists in terminating dispatch calls. The base stations 110, 112, and 114 provide a wireless interface between the internal network 102 and the SUs 116, 118, and 120. The internal network 102 may be of any suitable type, including Internet Protocol (IP), Asynchronous Transfer Mode (ATM), and frame relay. The SUs 116, 118, and 120 may be cellular handsets, laptop computers, personal digital assistants (PDAs), desktop computers, all having dispatch communication capability. An SU may also be connected directly to the external network, such as a dispatch-to-desktop device.

The wireless communication system 100 may be coupled to the external network 150, which may be, for example, the Internet, a wide area network (WAN), an intranet, or a local area network (LAN). In particular, the wireless communication system 100 is coupled to the external network 150 by way of its gateway 106. A plurality of servers are coupled to the external network 150 to provide services to the subscribers of the wireless communications system 100.

These servers include a dispatch server 152, a speech-to-text server 154, a text-to-speech server 156, and a blog server 158. The dispatch server 152 generates and receives dispatch communications to and from subscribers, and communicates with the other servers 154, 156, and 158 to implement the methods described herein. The speech-to-text server 154 converts digital speech information into text. The text-to-speech server 156 converts text into digital speech information. And, the blog server 158 posts messages on blog webpages, notifies subscribers of the posting of recent messages, and provides subscribers with the requested messages. Although, in this example, the servers are shown as separate entities connected to the external network 150, it shall be understood that any combination of the servers may be integrated.

The following describes various methods implemented by the wireless communication system 100. These methods include an exemplary method of posting a new message on a blog webpage; a couple of exemplary methods of notifying an SU of the posting of a new message on a blog webpage; and several exemplary methods of delivering a posted blog message to a requesting SU.

Figure 2:
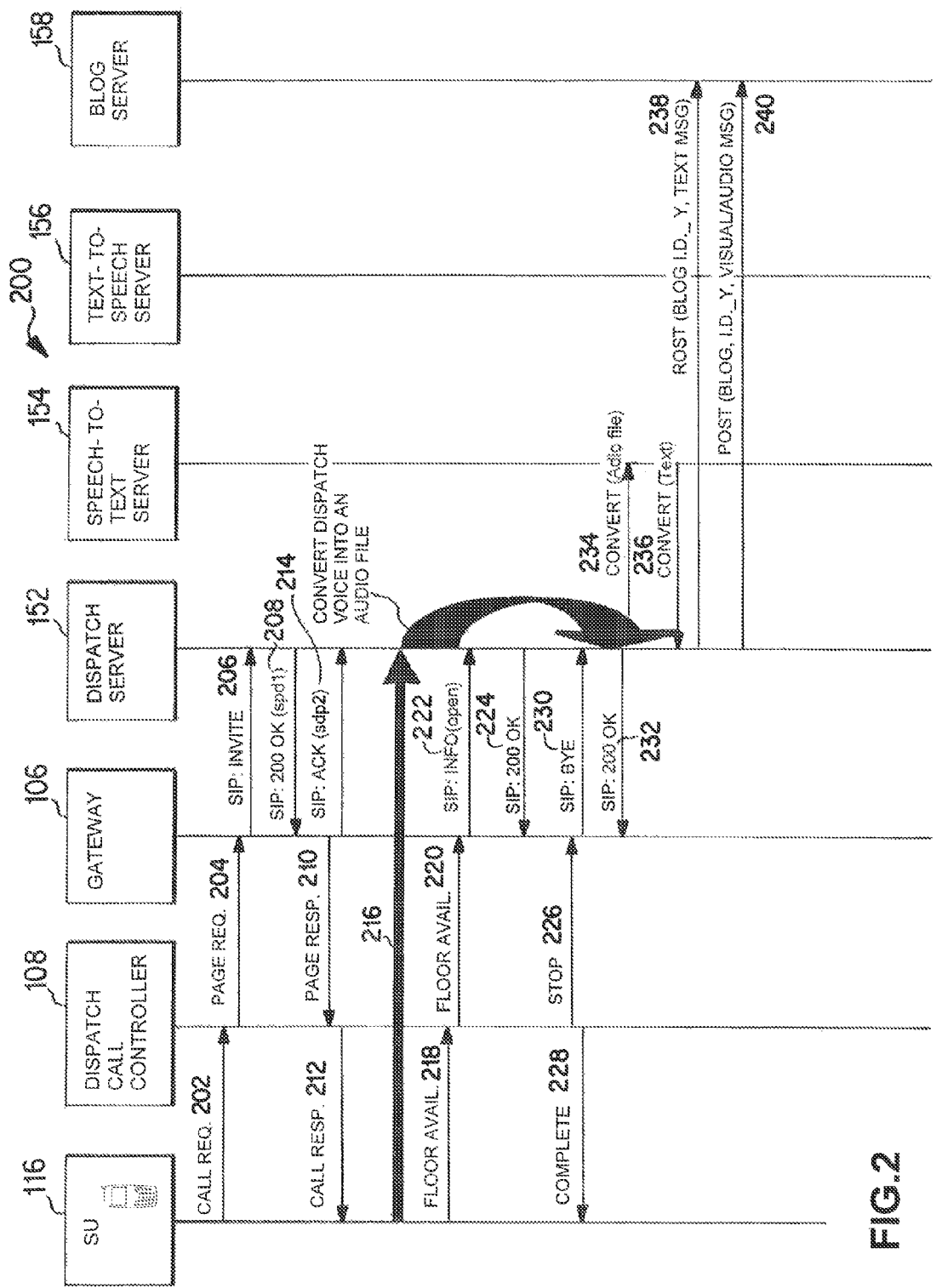
FIG. 2 illustrates a signal flow diagram related to an exemplary method of posting a new message on a web logging ("blog") webpage in accordance with another embodiment of the invention.

FIG. 2 illustrates a signal flow diagram related to an exemplary method 200 of posting a message on a blog webpage in accordance with an embodiment of the invention. In this example, the user operating SU 116 desires to post a message on a webpage generated by blog server 158 using a dispatch communication.

In summary, the method 200 entails the setting up of a dispatch communication link between the SU 116 and the dispatch server 152, the SU 116 sending a dispatch multimedia communication containing the message to be posted to the dispatch server 152 via the dispatch communication link; the terminating of the dispatch communication link; the dispatch server 152 converting the dispatch multimedia communication into an audio file; the dispatch server 152 sending the audio file to the speech-to-text server 154 and receiving a corresponding text file therefrom; and the dispatch server 152 sending the text file to the blog server 158 for posting on the appropriate webpage.

The setting up of the dispatch communication link between the SU 116 and the dispatch server 152 is detailed in messages 202 through 214. In particular, the SU 116, in response to the user activating the SU 116 to send a dispatch multimedia message for posting on a blog webpage, transmits a CALL REQ. message 202 to the dispatch call controller 108 by way of the base station 110 and the internal network 102. The CALL REQ. message 202 includes information related to the identities of the SU 116 and the dispatch server 152.

After receiving the CALL REQ. message 202, the dispatch call controller 108 sends a PAGE REQ. message 204 to the gateway 106 by way of the internal network 102. In response to receiving the PAGE REQ. message 204, the gateway 106 sends a Session Initiation Protocol (SIP): INVITE message 206 to the dispatch server 152 by way of the external network 150. The SIP: INVITE message 206 informs the dispatch server 152 that an SU desires to communicate with it in dispatch mode. Although SIP is being used to illustrate the embodiments of the invention, it shall be understood that other protocols may be used as well. In addition, it shall be understood that the protocol used by the internal network 102 could also be SIP as well (i.e., the same protocol used by the external network 150). In such a case, there may not be a need for the gateway 106.

If the dispatch server 152 is available to communicate with the requesting SU 116, the dispatch server 152 sends a SIP: 200 OK session description protocol 1 (sdp1) message 208 to the gateway 106 by way of the external network 150. In response, the gateway 106 sends a SIP: ACK (sdp2) message 214 back to the dispatch server 152 by way of the external network 150 acknowledging receipt of the SIP: 200 OK (sdp1) message 208. Also, the gateway 106 sends a PAGE RESP. message 210 to the dispatch call controller 108 by way of the internal network 102 informing it that the dispatch server 152 is available to communicate with the SU 116, and to begin setting up the dispatch communication link. In response, the dispatch call controller 108 sets up the dispatch communication link and sends a CALL RESP. message 212 to the SU 116 by way of the internal network 102 and base station 110 granting the SU 116 the privilege to transmit a dispatch multimedia message.

Accordingly, in response to being granted the privilege to transmit a dispatch message, the user may speak into the SU 116 thereby generating a dispatch multimedia communication 216 which is transmitted to the dispatch server 152 by way of the base station 110, internal network 102, gateway 106, and external network 150. The dispatch multimedia communication 216 contains the identity of the blog and the message to be posted on the blog webpage maintained by the blog server 158. In this example, the dispatch communication contains audio information. It shall be understood that the dispatch communication may contain other multimedia formats, such as text, image, and video. The dispatch voice packets sent from the SU 116 to the dispatch server 152 may be sent first to the media server 104 by way of the base station 110 and internal network 102. The media server 104 configures the dispatch voice packets to be sent to the gateway 106 by way of the internal network 102 for subsequent transmission to the dispatch server 152 by way of the external network 150.

After the user completes generating the dispatch multimedia communication 216 by releasing the appropriate button on the SU 116, the termination of the dispatch communication link occurs, which is detailed in messages 218 through 232. In particular, the SU 116 transmits a FLOOR AVAILABLE message 218 to the dispatch call controller 108 by way of the base station 110 and internal network 102 to open the dispatch communication link. The dispatch call controller 108, in response, sends another FLOOR AVAIL. message 220 to the gateway 106 by way of the internal network 102.

In response to receiving the FLOOR AVAIL. message 220, the gateway 106 sends a SIP:INFO (open) message 222 to the dispatch server 152 by way of the external network 150 to inform the server 152 of the opening of the dispatch communication link. In response, the dispatch server 152 sends a SIP: 200 OK message 224 to the gateway 106. Although SIP is being used for floor control to illustrate the exemplary embodiments of the invention, it shall be understood that other protocols, such as Real Time Control Protocol (RTCP), may be used as well.

Once the dispatch communication link between the SU 116 and the dispatch server 152 is opened, the dispatch call controller 108 initiates a timer with a predetermined time interval. In this example, the time interval expires which causes the dispatch call controller 108 to send a STOP message 226 to the gateway 106 by way of the internal network 102 to inform the dispatch server 152 that the dispatch communication link is being terminated. The dispatch call controller 108 also sends a COMPLETE message 228 to the SU 116 by way of the internal network 102 and base station 110 to inform the SU 116 that the dispatch communication link between the SU 116 and the dispatch server 152 has been terminated.

In response to receiving the STOP message 226, the gateway 106 sends a SIP:BYE message 230 to the dispatch server 152 by way of the external network 150 to inform the dispatch server 152 that the dispatch communication link between the SU 116 and the dispatch server 152 has been terminated. The dispatch server 152 responds by sending a SIP: 200 OK message 232 to the gateway 106 by way of the external network 150 acknowledging the receipt of the message 230.

Once the dispatch communication link between the SU 116 and dispatch server 152 is terminated, the dispatch server 152 may generate an audio file 234 from the dispatch multimedia communication 216 received from the SU 116, and may then transmit the audio file 234 to the speech-to-text server 154 by way of the external network 150. The audio file 234 can be in any of a number of protocols, such as .wav and .mp3. The speech-to-text server 154 performs speech recognition and converts the audio file 234 into a text file 236. The speech-to-text server 154 then sends the text file 236 to the dispatch server 152 by way of the external network 150.

The dispatch server 152 then analyzes the text file 236 to parse the identity of, for example, user Y's blog (e.g., the blog I.D._Y) to which the message is to be posted. Using the blog I.D._Y, the dispatch server 152 then sends a Request 238 (e.g., Post (blog I.D._Y, Text Msg)) to post the message contained in the text file to the blog server 158 by way of the external network 150. The Request 238 contains the message to be posted. The blog server 158 then posts the text message on the blog webpage which could be subsequently downloaded by anyone having authorization to access the webpage. Alternatively, or in addition to, the dispatch server 152 could also send the original audio file 234 and/or other multimedia information 240 (e.g., Post (blog I.D._Y, Visual/Audio Msg)) received from the SU 116 to the blog server 158 by way of the external network 150. In such a case, the blog server 158 would format the presentation of the multimedia message, and posts the message on the blog webpage available to anyone authorized to access the webpage.

Before the blog server 158 posts the message on user Y's blog, the blog server 158 may authenticate the posting request to determine whether the posting entity (e.g., SU 116) is eligible to post the message. In making this determination, the blog server 158 may access a local memory for credential information related to the posting entity. Alternatively, the blog server 158 may send a query for such credential information to an external server, and subsequently receive the information from the external server. Yet another alternative is for the blog server 158 to send an approval request to the owner of the blog, user Y, (via email, dispatch or other communication type) requesting approval to accept the posting request. Once it has authenticated the posting request, the blog server 158 proceeds with the posting of the message as discussed above.

Figure 3:
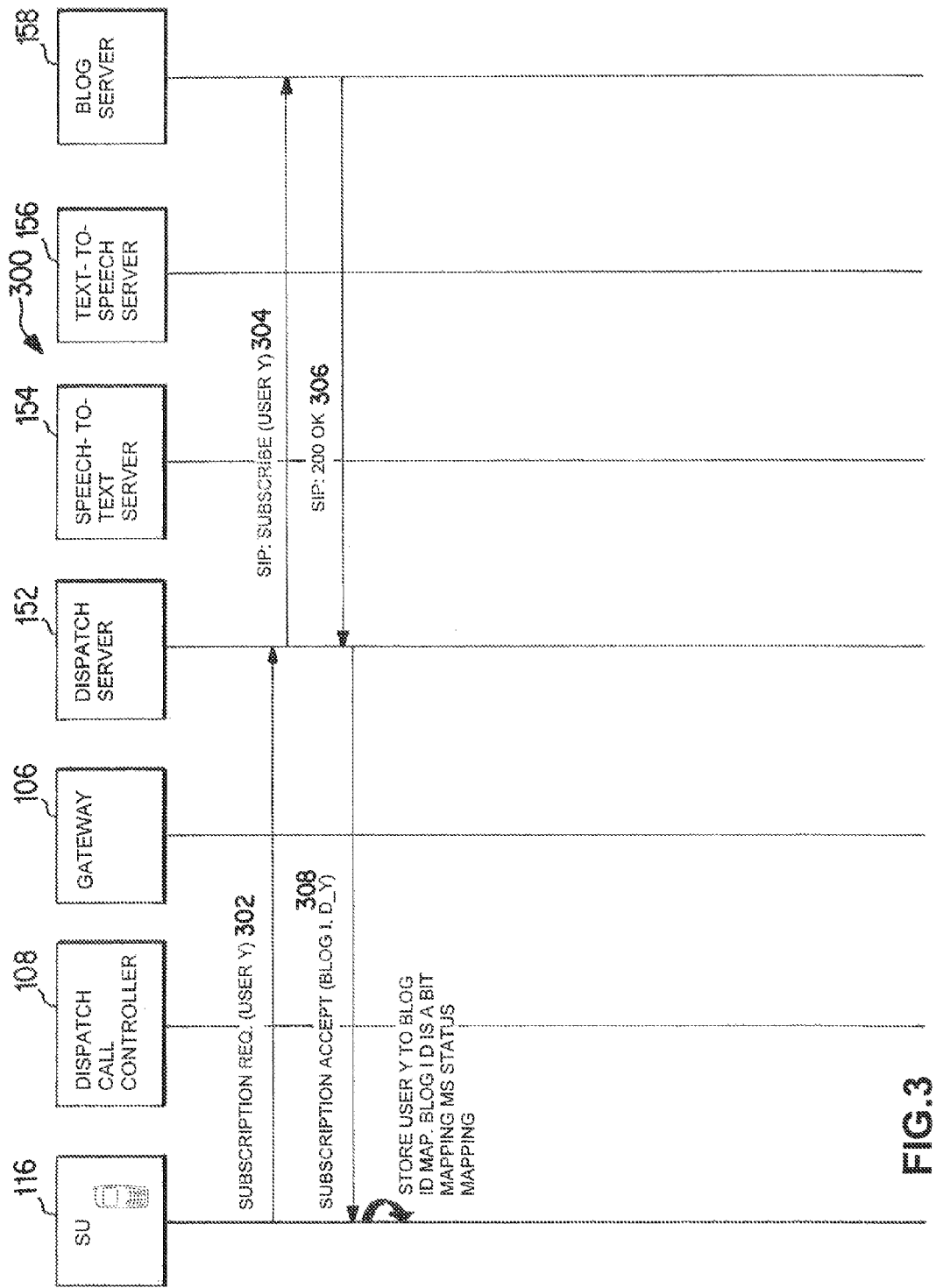
FIG. 3 illustrates a signal flow diagram related to an exemplary method of a subscriber unit subscribing to a blog service in accordance with another embodiment of the invention.

FIG. 3 illustrates a signal flow diagram of an exemplary method 300 of a subscriber unit subscribing to a blog service in accordance with another embodiment of the invention. In order for the SU 116 to automatically receive notifications of new messages posted on user Y's blog webpage, it should subscribe for such services from the blog server 158. The method 300 comprises the SU 116 transmitting a SUBSCRIPTION REQ. (user Y) message 302 to the dispatch server 152 by way of the base station 110, internal network 102, gateway 106, and external network 150. The dispatch server 152, in turn, sends a SIP: SUBSCRIBE (user Y) message 304 to the blog server 158 by way of the external network 150 to inform the blog server 158 of the subscription request. The messages 302 and 304 include information as to the identity of user Y's blog.

In response to the subscription request, the blog server 158 may authenticate the subscription request to determine whether the subscriber is eligible to receive services from user Y's blog. In making this determination, the blog server 158 may access a local memory for credential information related to the candidate subscriber. Alternatively, the blog server 158 may send a query for such credential information to an external server, and subsequently receive the information from the external server. Yet another alternative is for the blog server 158 to send an approval request to the owner of the blog, user Y, (via email, dispatch or other communication type) requesting approval to provide blog service to the candidate subscriber.

Once the blog server 158 has approved the subscription request, the blog server 158 registers SU 116 as a subscriber to user Y's blog. The blog server 158 then sends a SIP: 200 OK message 306 to the dispatch server 152 by way of the external network 150 to inform it that the subscription request has been accepted. The dispatch server 152 generates a blog I.D._Y which is used to map SU 116 to user Y's blog service. The blog I.D._Y may also be used to map other SUs to user Y's blog services. In response, the dispatch server 152 sends a SUBSCRIPTION ACCEPT (blog I.D._Y) message 308 to the SU 116 by way of the gateway 106, internal network 102, and base station 110. The SUBSCRIPTION ACCEPT (blog I.D._Y) message 308 informs the SU 116 that it is now a subscriber to user Y' blog service. The SU 116 stores the blog I.D._Y for use in mapping the blog I.D._Y to user Y. For example, the blog I.D._Y may be an 8-bit identifier. Alternatively, the blog I.D._Y may be a Universal Fleet Member Identifier (UFMI), a SIP URI, Tel URI, or an E.164.

The above method 300 of subscribing to blog services provided by user Y's blog is merely one example. There are many other ways that a candidate subscriber may subscribe to user Y's blog service. For instance, the candidate subscriber may subscriber by accessing a webpage associated with user Y's blog service. The webpage may include an input object to obtain information related to the candidate subscriber in order to assess whether the subscriber is eligible for user Y's blog service. Alternatively, the candidate subscriber may subscribe by sending a subscription request via an email to an email address associated with user Y's blog service.

Figure 4A:
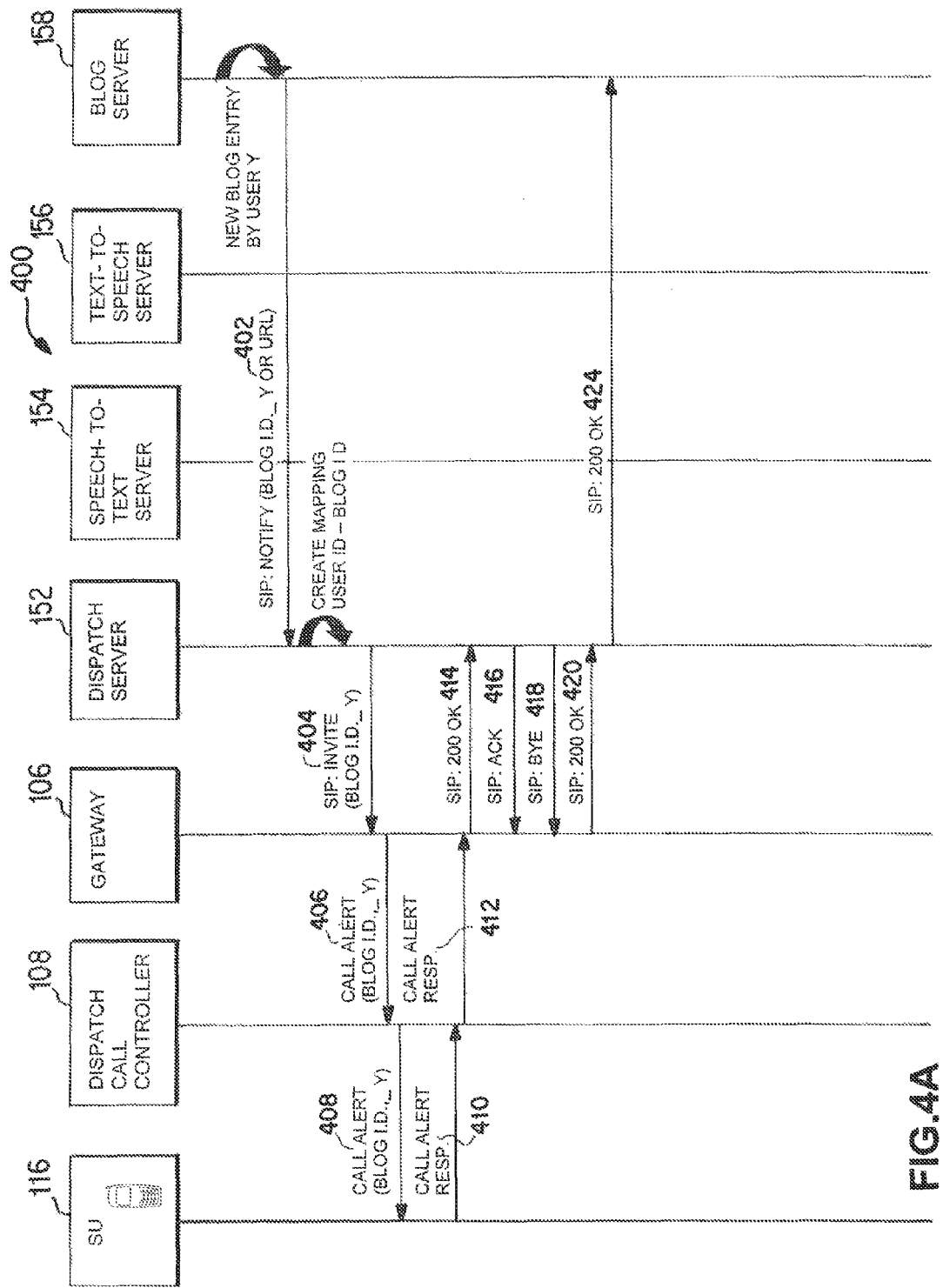
FIG. 4A illustrates a signal flow diagram related to an exemplary method of notifying a subscriber unit of the posting of a new message in accordance with another embodiment of the invention.

FIG. 4A illustrates a signal flow diagram related to an exemplary method 400 of notifying a subscriber unit of the posting of a new message in accordance with another embodiment of the invention. In summary, the method 400 entails a new message posted on user Y's webpage, the blog server 158 sending a notification to the dispatch server 152; the dispatch server 152 then sending a call alert message to the SU 116 to inform it that a new message has been posted on user Y's blog webpage; and the dispatch server 152 informing the blog server 158 that it has or will notify SU 116 of the posting of the message.

More specifically, once the SU 116 is registered to receive services from user Y's blog, when a new message is posted on user Y's webpage, the blog server 158 sends a notification to the SU 116. In this regard, blog server 158 sends a SIP: NOTIFY (blog I.D._Y or URL of Msg) message 402 to the dispatch server 152 by way of the external network 150. The dispatch server 152 may map the Universal Resource Locator (URL) of the posted message into the corresponding blog I.D._Y, which identifies the message. Using the blog I.D._Y, the dispatch server 152 knows which SUs, such as SU 116, to send a call alert for notification of the recent posting of the message on user Y's blog webpage. If the blog I.D._Y is associated with a plurality of SUs, the dispatch server 152 may assign a group call I.D. as the blog I.D._Y. In such a case, the dispatch server 152 would initiate a group call to send call alerts to the SUs identified by the group call I.D.

Once the dispatch server 152 obtains the notification, it sends a call alert to SU 116, which is detailed in messages 404 to 420. In particular, the dispatch server 152 sends a SIP: INVITE (blog I.D._Y) message 404 to the gateway 106 by way of the external network 150. The gateway 106 then sends a CALL ALERT (blog I.D._Y) message 406 to the dispatch call controller 108 by way of the internal network 102. The dispatch call controller 108 then sends a CALL ALERT (blog I.D._Y) message 408 to the SU 116 by way of the internal network 102 and base station 110, thereby informing the SU 116 that a new message has been posted on user Y's blog webpage. In notifying the user, SU 116 maps the blog I.D._Y to user Y's identity information.

In response to receiving the CALL ALERT message 408, the SU 116 sends a CALL ALERT RESP. message 410 to the dispatch call controller 108 by way of the base station 110 and internal network 102. The dispatch call controller 108, in turn, sends a CALL ALERT RESP. message 412 to the gateway 106 by way of the internal network 102. The gateway 106 then sends a SIP:200 OK message 414 to the dispatch server 152 by way of the external network 150 informing the dispatch server 152 that the CALL ALERT message 408 was received by the SU 116. The dispatch server 152, responds by sending a SIP: ACK message 416 to the gateway 106 acknowledging receipt of the message 414.

The dispatch server 152 then transmits a SIP:BYE message 418 to the gateway 106 by way of the external network 150 to end the communication session. The gateway 328 responds by transmitting a SIP: 200 OK message 420 to the dispatch server 152 by way of the external network 150 acknowledging the end of the communication session. The dispatch server 152 then sends a SIP: 200 OK message 424 to the blog server 158 by way of the external network 150 to inform the blog server 158 that the SU 116 has been notified. Alternatively, the message 424 may be sent to the blog server 158 immediately after the dispatch server 152 receives the SIP: NOTIFY (blog I.D._Y or URL of Msg) 402 message to inform the blog server 158 that the notification will be sent to the SU 116.

Figure 4B:
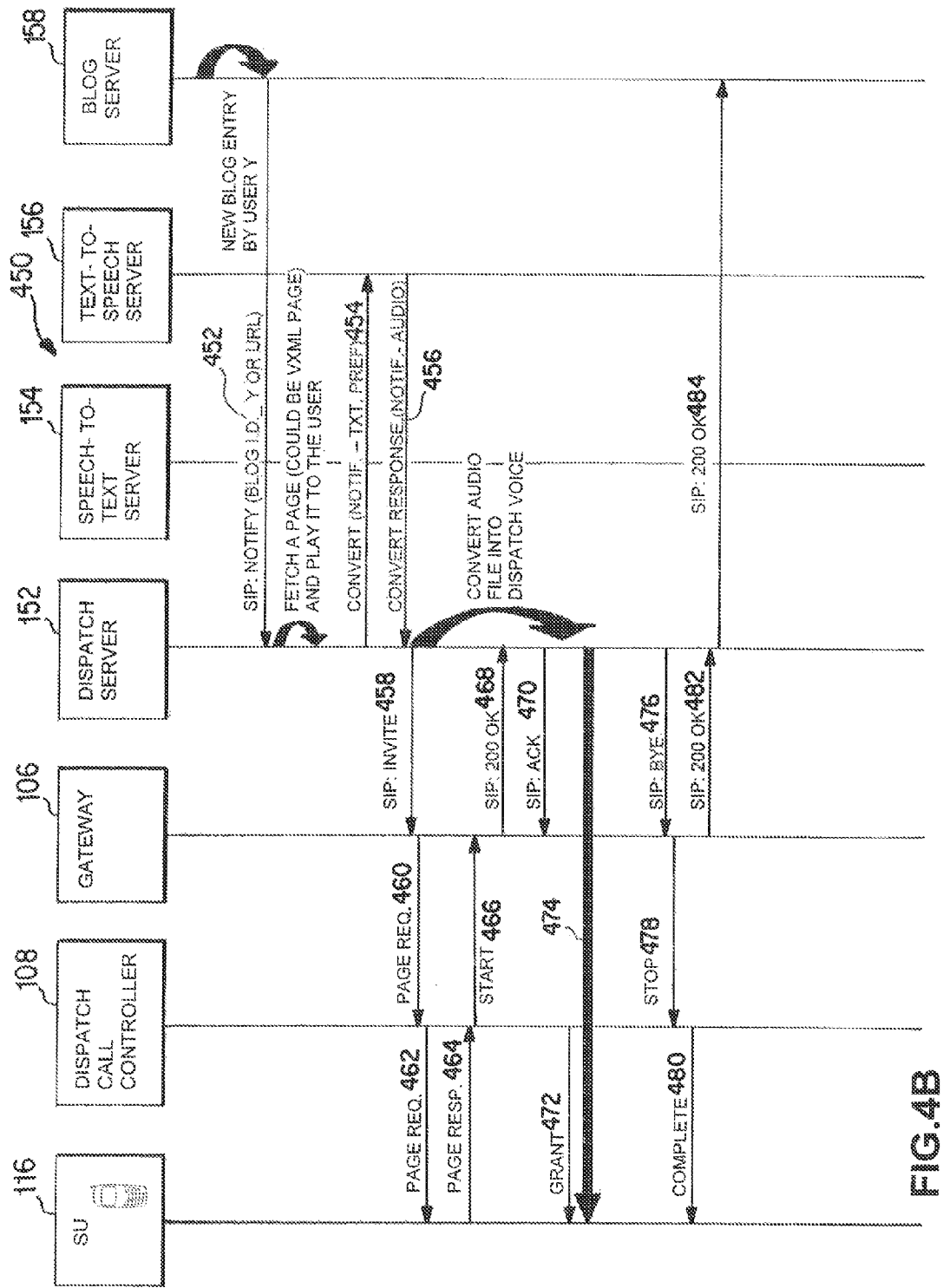
FIG. 4B illustrates a signal flow diagram related to another exemplary method of notifying a subscriber unit of the posting of a new message in accordance with another embodiment of the invention.

FIG. 4B illustrates a signal flow diagram related to another exemplary method 450 of notifying a subscriber unit of the posting of a new message in accordance with another embodiment of the invention. In summary, the method 450 entails a new message posted on user Y's webpage, the blog server 158 sending a text-based notification to the dispatch server 152; the dispatch server 152 then having the text-to-speech server 156 convert the text notification into an audio file based on user preference information; then the setting up of a dispatch communication link between the dispatch server 152 and the SU 116; then the dispatch server 152 sending a dispatch multimedia communication including the audio notification to the SU 116 by way of the dispatch communication link; then the terminating of the dispatch communication link; and the dispatch server 152 informing the blog server 158 that it has or will notify the SU 116 of the posting of the message.

More specifically, when a new message is posted on the blog webpage, the blog server 158 sends a notification to the SU 116. In this regard, blog server 158 sends a SIP:NOTIFY (blog I.D._Y or URL of Msg) message 452 to the dispatch server 152 by way of the external network 150. The dispatch server 152 may retrieve preference file associated with SU 116 from a local memory or external server which defines various parameters for the notification. This information, for example, may be stored as a VXML page or other suitable formats. In addition, the user preference file may contain information such as, for example, whether the user of SU 116 desires an audio notification in a female's voice. The dispatch server 152 may also map the URL of the message into to the blog I.D._Y, which is used to identify the message and its recipients, such as SU 116, and possibly others.

The dispatch server 152 then sends a request to Convert (Notif.-Txt, Pref) 454 the text notification into an audio notification using the user preference information to the text-to-speech server 156 by way of the external network 150. The text-to-speech server 156 converts the notification into an audio file based on the user preference information. After the conversion, the text-to-speech server 156 sends the Convert Response (Notif.-Audio) 456 to the dispatch server 152 by way of the external network 150.

Once the dispatch server 152 receives the notification audio file 456, a dispatch communication link is set up between the dispatch server 152 and the SU 116, which is detailed in messages 458 through 482. In particular, the dispatch server 152 sends a SIP: INVITE message 458 to the gateway 106 by way of the external network 150. In response, the gateway 106 sends a PAGE REQ. message 460 to the dispatch call controller 108 by way of the internal network 102. The dispatch call controller 108, in turn, sends a PAGE REQ. message 462 to the SU 116 by way of the internal network 102 and base station 110 in order to page SU 116.

If SU 116 is available, it responds by sending a PAGE RESP. message 464 to the dispatch call controller 108 by way of the internal network 102. The dispatch call controller 108, in turn, sends a START message 466 to the gateway 106 by way of the internal network 102. The gateway 106 then sends a SIP: 200 OK message 468 to the dispatch server 152 by way of the external network 150. Once receiving a notification that the SU 116 has been paged and is available, the dispatch server 152 sends a SIP: ACK message 470 to the gateway 106 by way of the external network 150. The dispatch call controller 108 then sets up the dispatch communication link and sends a GRANT message 472 to the SU 116.

Once the dispatch communication link is set up, the dispatch server 152 converts the audio file into a dispatch multimedia communication 474 containing the audio notification, and sends it to the SU 116 by way of the dispatch communication link. Once the dispatch multimedia communication 474 has been sent to the SU 116, the dispatch server 152 then initiates the termination of the dispatch communication link. In this regard, the dispatch server 152 sends a SIP: BYE message 476 to the gateway 106 by way of the external network 150. The gateway 106, in turn, responds by sending a SIP: 200 OK message 482 to the dispatch server 152 by way of the external network 150. The gateway 106 also sends a STOP message 478 to the dispatch call controller 108 by way of the internal network 102. The dispatch call controller 108, in turn, sends a COMPLETE message 480 to the SU 116 by way of the internal network 102 and the base station 110.

Once the dispatch communication link is terminated, the dispatch server 152 sends a SIP: 200 OK message 484 to the blog server 158 by way of the external network 150 informing it that the notification has been delivered to SU 116. Alternatively, the SIP: 200 OK message 484 may be sent to the blog server 158 immediately after the dispatch server 152 has fetched the user preference file, as discussed above. In such case, the message 484 indicates that the SU 116 will be notified.

It shall be understood that the dispatch server 152 may provide such notification to the SU 116 via another type of dispatch multimedia communication, such as a text, image and/or video. In addition, as discussed above, in the case where a plurality of SUs are to receive the notification, the dispatch server 152 may assign a group call I.D. as the blog I.D._Y. In such a case, the dispatch server 152 would initiate a group call to send a dispatch multimedia communication containing the notification to each of the SUs identified by the group I.D. and available to receive the communication.

It shall be understood that the blog server 158 may notify a user of the SU 116 of the posting of a message in many other ways apart from sending a dispatch communication to the SU 116. For example, the blog server 158 may send an email containing such notification to the user of SU 116. The email may be sent to an email address designated by the user of SU 116. The email may be downloaded by the SU 116 itself or some other device. As another example, the blog server 158 may also notify the user of SU 116 by sending a Short Messaging Service (SMS) message to the user. The SMS message may be received by the SU 116 itself or some other device.

Figure 5:
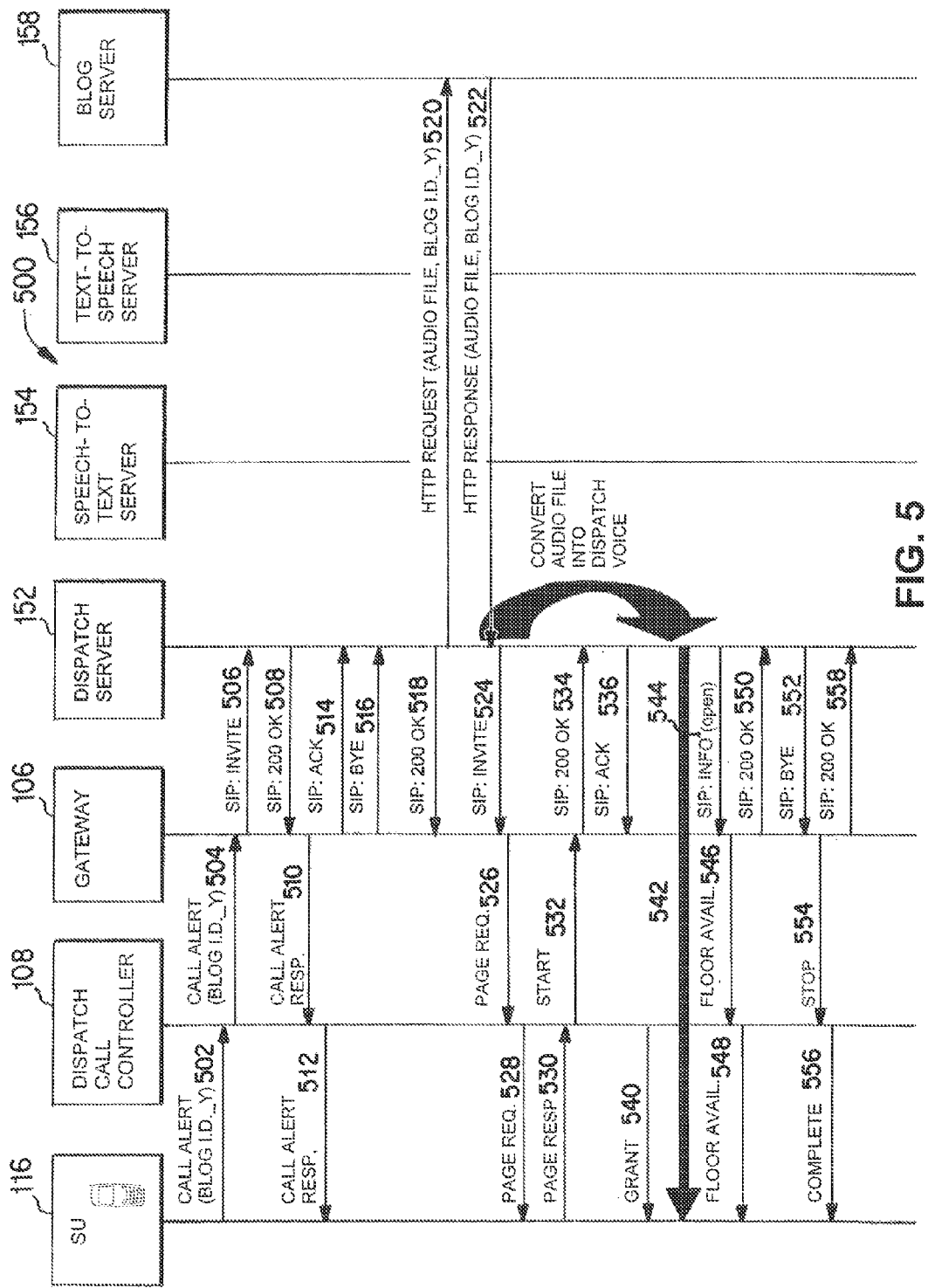
FIG. 5 illustrates a signal flow diagram related to an exemplary method of retrieving a posted message in accordance with another embodiment of the invention.

FIG. 5 illustrates a signal flow diagram related to an exemplary method 500 of retrieving a posted message in accordance with another embodiment of the invention. In summary, the method 500 entails the SU 116 sending a call alert to the dispatch server 152 to inform it of the blog I.D._Y of user Y's blog; the dispatch server 152 retrieving an audio file of the message from the blog server 158; the setting up of a dispatch communication link between the dispatch server 152 and the SU 116; the dispatch server 152 sending a dispatch multimedia communication containing the audio message to the SU 116 via the dispatch communication link; and the terminating of the dispatch communication link.

Prior to the SU 116 sending the call alert to the dispatch server 152, the SU 116 may have communicated with the blog server 158 to perform a filtering operation to retrieve particular message(s) that meet a filtering parameter. The filtering parameter may be any criteria that limits the number of messages to be retrieved. For example, the filtering parameter may include message delimiters, such as by date, time, subject matter, author, and others. Thus, when such filter parameters are communicated to the blog server 158, the blog server 158 sends only messages to the SU 116 that meet the filter parameter.

The sending of a call alert to the dispatch call controller 108 to inform it of user Y's blog I.D._Y is detailed in messages 502 through 518. Specifically, the SU 116 sends a CALL ALERT (blog I.D._Y) message 502 to the dispatch call controller 108 by way of the base station 110 and the internal network 102. The blog I.D._Y may identify user Y's blog and possibly the message to be retrieved, which was identified in the filtering process discussed above. The dispatch call controller 108, in turn, sends a CALL ALERT (blog I.D._Y) message 504 to the gateway 106 by way of the internal network 102. The gateway 106 sends a SIP: INVITE message 506 to the dispatch server 152 by way of the external network 150. In response, the dispatch server 152 sends a SIP: 200 OK message 508 back to the gateway 106 by way of the external network 150. The gateway 106 sends a CALL ALERT RESP. message 510 to the dispatch call controller 108 by way of the internal network 102. The dispatch call controller 108, in turn, sends a CALL ALERT RESP. message 512 to the SU 116 by way of the internal network 102 and base station 110. The gateway 106 also sends a SIP: ACK message 514 followed by a SIP:BYE message 516 to the dispatch server 152.

Once the call alert informs the dispatch server 152 of the blog I.D._Y of user Y's blog, the dispatch server 152 maps the blog I.D._Y to the address of user Y's blog either using a local memory or external server. Then, the dispatch server 152 retrieves an audio file of the message posted on user Y blog webpage. In this regard, the dispatch server 152 sends a Request (audio file, blog I.D._Y) 520 for an audio message (e.g., an HTTP request) to the blog server 158 by way of the external network 150. The blog server 158 uses this information to search and find an audio message posted on user Y's blog according to the filtering process described above. Once it has retrieved the audio message, the blog server 158 sends the Response (audio file, blog I.D._Y) 522 to the dispatch server 152 by way of the external network 150.

Before the blog server 158 retrieves and sends the requested message to the dispatch server 152, the blog server 158 may authenticate the message retrieval request to determine whether the requesting entity (e.g., SU 116) is eligible to receive the message. In making this determination, the blog server 158 may access a local memory for credential information related to the requesting entity. Alternatively, the blog server 158 may send a query for such credential information to an external server, and subsequently receive the information from the external server. Yet another alternative is for the blog server 158 to send an approval request to the owner of the blog, user Y, (via email, dispatch or other communication type) requesting approval to send the message to the requesting entity. Once it has authenticated the message retrieval request, the blog server 158 proceeds with the sending of the message as discussed above.

Once the dispatch server 152 has the audio message file 522, it establishes a dispatch communication link with the SU 116 which is detailed in messages 524 to 540. In particular, the dispatch server 152 sends a SIP: INVITE message 524 to the gateway 106 by way of the external network 150. The gateway 106 sends a PAGE REQ. message 526 to the dispatch call controller 108 by way of the internal network 102. The dispatch call controller 108, in turn, sends a PAGE REQ. message 528 to the SU 116 by way of the internal network 102 and base station 110 in order to page the SU 116.

If SU 116 is available, the SU sends a PAGE RESP. message 530 to the dispatch call controller 108 by way of the base station 110 and internal network 102. The dispatch call controller 108 then sends a START message 532 to the gateway 106 by way of the internal network 102. The gateway 106, in turn, sends a SIP: 200 OK message 534 to the dispatch server 152 by way of the external network 150, to inform the dispatch server 152 that SU 116 is available.

In response, the dispatch server 152 sends a SIP: ACK message 536 to the gateway 106 by way of the external network 150. The dispatch call controller 108 sets up the dispatch communication link and sends a GRANT message 540 to the SU 116 by way of the internal network 102 and base station 110, to inform it that a dispatch communication link has been set up between SU 116 and the dispatch server 152.

Once the dispatch communication link between the SU 116 and the dispatch server 152 has been set up, the dispatch server 152 converts the audio file into a dispatch multimedia communication 542 containing the audio message being retrieved by SU 116, and sends it to the SU 116 by way of the gateway 106, internal network 102, and base station 110.

It shall be understood that the dispatch server 152 may provide the message to the SU 116 via another type of dispatch multimedia communication, such as a text, image and/or video. In addition, in the case where a plurality of SUs are to receive the message, the dispatch server 152 may assign a group call I.D. as the blog I.D._Y. In such a case, the dispatch server 152 would initiate a group call to send a dispatch multimedia communication containing the message to each of the SUs identified by the group call I.D.

Once the dispatch server 152 has sent the dispatch multimedia communication 542, the dispatch server 152 begins the process of terminating the dispatch communication link which is detailed in messages 544 to 558. In this regard, the dispatch server 152 sends a SIP: INFO (open) message 544 to the gateway 106 by way of the external network 150. In response, the gateway 106 sends a FLOOR AVAIL. message 546 to the dispatch call controller 108 by way of the internal network 102. The dispatch call controller 108 then sends a FLOOR AVAIL. message 548 to the SU 116 by way of the internal network 102 and the base station 110. After sending the FLOOR AVAIL. message 546 to the dispatch call controller 108, the gateway 106 sends a SIP: 200 OK message 550 to the dispatch server 152 by way of the external network 150.

The dispatch server 152 then sends a SIP:BYE message 552 to the gateway 106 by way of the external network 150. In response, the gateway 106 sends a STOP message 554 to the dispatch call controller 108 by way of the internal network 102, in order to terminate the dispatch communication link. The gateway 106 also sends a SIP: 200 OK message 558 to the dispatch server 152 by way of the external network 150. In response to receiving the STOP message 554, the dispatch call controller 108 terminates the dispatch communication link. The dispatch call controller 108 also sends a COMPLETE message 556 to the SU 116 by way of the internal network 102 and base station 110, to inform it that the dispatch communication link has been terminated.

Figure 6:
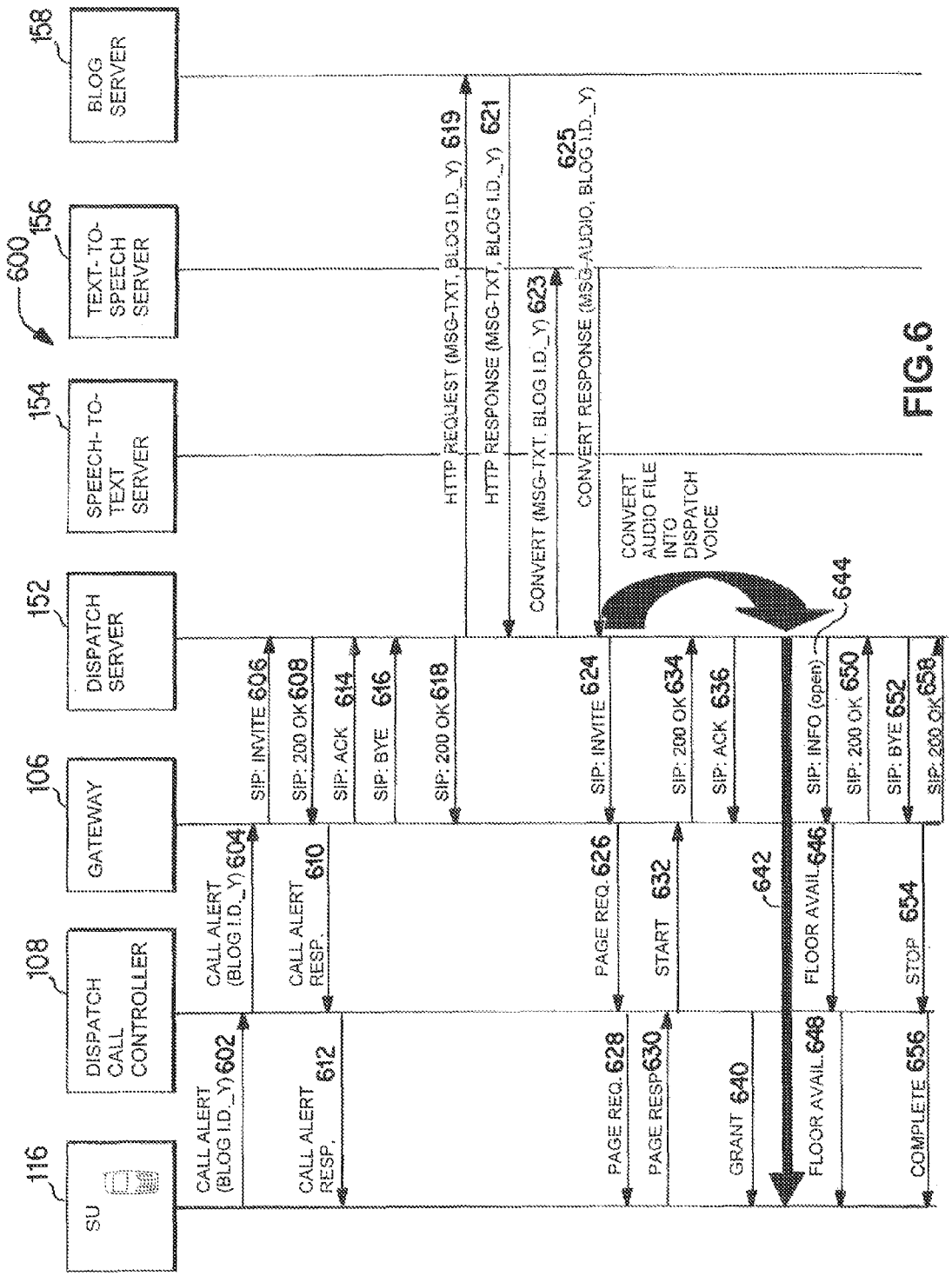
FIG. 6 illustrates a signal flow diagram related to another exemplary method of retrieving a posted message in accordance with another embodiment of the invention.

FIG. 6 illustrates a signal flow diagram related to another exemplary method 600 of retrieving a posted message in accordance with another embodiment of the invention. The method 600 is the same as method 500, except that the dispatch server 152 retrieves the posted message from the blog server 158 in text form, and then has it converted into audio form by the text-to-speech server 156. Messages of method 600 common with those of method 500 will be referred to with the same reference numbers except the most significant digit is a "6" instead of a "5". Accordingly, those common messages, having been discussed above in detail with reference to method 500, are not discussed in detail below with reference to method 600.

In summary, the method 600 entails the SU 116 sending a call alert to the dispatch server 152 to inform it of the blog I.D._Y of user Y's blog; the dispatch server 152 retrieving a text file of the message from the blog server 158; the dispatch server 152 having the text file converted into an audio file by the text-to-speech server 156; the dispatch server 152 then initiating the setup of a dispatch communication link between the dispatch server 152 and the SU 116; the dispatch server 152 then sending a dispatch multimedia communication containing the audio message to the SU 116 via the dispatch communication link; and the dispatch server 152 initiating the termination of the dispatch communication link. As discussed with reference to method 500, the SU 116 may have communicated with the blog server 158 to perform a filtering operation to retrieve particular message(s) that meet a filtering parameter (e.g., date, time, subject, author, etc.).

In particular, once the dispatch server 152 receives the blog I.D._Y of user Y from SU 116 pursuant to messages 602 to 618, the dispatch server 154 sends a Request (Msg-txt, blog I.D._Y) 619 to the blog server 158 by way of the external network 150 for a text file containing the message posted on user Y's blog. The blog server 158 then obtains and sends a Response (Msg-txt, blog I.D._Y) 621 containing the requested text message to the dispatch server 152 by way of the external network 150. As discussed above with reference to method 500, the blog server 158 may authenticate the message retrieval request before sending the requested message to the dispatch server 152.

The dispatch server 152 then sends a request to Convert (Msg-txt, blog I.D._Y) 623 the text message into an audio message to the text-to-speech server 156 by way of the external network 150 requesting a conversion of the text message into an audio file. The text-to-speech server 156 then converts the text message into an audio file, and sends the Response (Msg-Audio, blog I.D._Y) 625 containing the posted message in an audio format to the dispatch server 152 by way of the external network 150. The dispatch server 152 then establishes a dispatch communication link with the SU 116 pursuant to messages 624 to 640, converts the audio file 625 into a dispatch multimedia communication, sends the dispatch multimedia communication 642 to the SU 116 via the dispatch communication link, and terminates the dispatch communication link pursuant to messages 644 to 658.

It shall be understood that the dispatch server 152 may provide the message to the SU 116 via another type of dispatch multimedia communication, such as a text, image and/or video. In addition, in the case where a plurality of SUs are to receive the message, the dispatch server 152 may assign a group call I.D. as the blog I.D._Y. In such a case, the dispatch server 152 would initiate a group call to send a dispatch multimedia communication containing the message to each of the SUs identified by the group call I.D.

Figure 7:
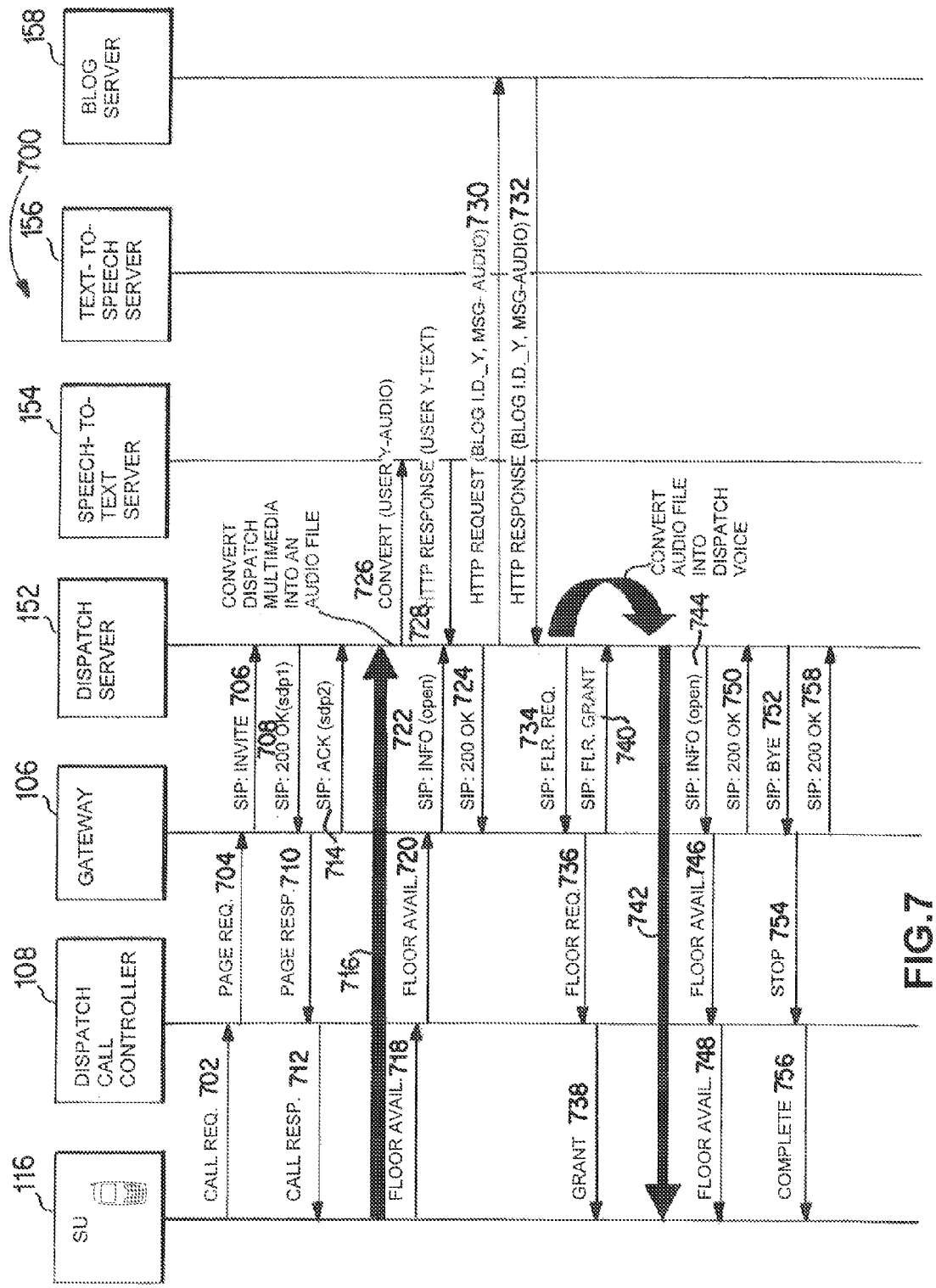
FIG. 7 illustrates a signal flow diagram related to another exemplary method of retrieving a posted message in accordance with another embodiment of the invention.

FIG. 7 illustrates a signal flow diagram related to yet another exemplary method 700 of retrieving a posted message in accordance with another embodiment of the invention. In summary, the method 700 entails the SU 116 initiating a dispatch communication link with the dispatch server 152; the SU 116 then sending a dispatch multimedia communication to the dispatch server 152 via the dispatch communication link to inform it of the identity of user Y's blog; the dispatch server 152 then retrieving an audio file of the message from the blog server 158; the dispatch server 152 then sending a dispatch multimedia communication containing the requested message to the SU 116 via the dispatch communication link; and then the dispatch server 152 initiating the termination of the dispatch communication link.

The SU 116 sending an audio message to the dispatch server 152 to inform it of the identity of user Y's blog is detailed in messages 702 through 724. The message may also contain the message filtering parameter to retrieve particular message(s) that meet a filtering parameter (e.g., date, time, subject, author, etc.). Specifically, the SU 116 sends a CALL REQ. message 702 to the dispatch call controller 108 by way of the base station 110 and the internal network 102. The dispatch call controller 108, in turn, sends a PAGE REQ. message 704 to the gateway 106 by way of the internal network 102. The gateway 106 then sends a SIP: INVITE message 706 to the dispatch server 152 by way of the external network 150.

In response, the dispatch server 152 sends a SIP: 200 OK (sdp1) message 708 back to the gateway 106 by way of the external network 150. The gateway 106 then sends a SIP: ACK (sdp2) message 714 to the dispatch server 152 by way of the external network 150. The gateway 106 also sends a PAGE RESP. message 710 to the dispatch call controller 108 by way of the internal network 102. Then, the dispatch call controller 108 sends a CALL RESP. 712 to the SU 116 by way of the internal network 102 and the base station 110.

Once the SU 116 receives the CALL RESP. message 712, the SU 116 sends a dispatch multimedia communication 716 containing the identity of user Y's blog to the dispatch server 152 by way of the base station 110, internal network 102, the gateway 106, and the external network 150. After sending the dispatch multimedia communication 716, the SU 116 sends a FLOOR AVAIL. message 718 to the dispatch call controller 108 by way of the base station 110 and internal network 102. The dispatch call controller 108, in turn, sends a FLOOR AVAIL. message 720 to the gateway 106 by way of the internal network 102. The gateway 106 then sends a SIP:INFO (Open) message 722 to the dispatch server 152 by way of the external network 150. In response, the dispatch server 152 sends a SIP: 200 OK message 724 to the gateway 106 by way of the external network 150.

Once the dispatch server 152 has received the dispatch multimedia communication 716 containing the identity of user Y's blog, the dispatch server 152 converts the dispatch multimedia communication into an audio file, and sends a Request (User Y-audio) 726 to the speech-to-text server 154 by way of the external network 150. The speech-to-text server 154 converts the User Y audio file 726 into a User Y-text file 728 and sends it to the dispatch server 152 by way of the external network 150.

The dispatch server 152 then analyzes the text file 728 to parse the identity of the blog (e.g., the blog I.D._Y) from which the posted message is to be retrieved. Using the blog I.D._Y, the dispatch server 152 converts the blog I.D._Y into an address associated with user Y's blog and requested message. The dispatch server 152 then sends a Request (blog I.D._Y, Msg-Audio) 730 for an audio message posted on user Y's blog to the blog server 158 by way of the external network 150. In response, the blog server 158 retrieves and sends the Response (blog I.D._Y, Msg-Audio) 732 containing the requested message in audio to the dispatch server 152 by way of the external network 150. As discussed above with reference to method 500, the blog server 158 may authenticate the message retrieval request before sending the requested message to the dispatch server 152.

Once the dispatch server 152 has the audio file 732, it initiates the setup of a dispatch communication link with the SU 116 pursuant to messages 734 to 740. In this regard, the dispatch server 152 sends a SIP: FLOOR REQ. message 734 to the gateway 106 by way of the external network 150. The gateway 106 sends a FLOOR REQ. message 736 to the dispatch call controller 108 by way of the internal network 102. The dispatch call controller 108, in turn, sends a GRANT message 738 to the SU 116 by way of the internal network 102 and base station 110, and another GRANT message. The gateway 106 then sends a SIP: FLOOR GRANT message 740 to the dispatch server 152 by way of the external network 150 to confirm that the dispatch communication link has been set up.

Once the dispatch communication link between the SU 116 and the dispatch server 152 has been set up, the dispatch server 152 converts the audio file into a dispatch multimedia communication 742 containing the audio message and sends it to the SU 116 by way of the dispatch communication link. It shall be understood that the dispatch server 152 may provide the message to the SU 116 via another type of dispatch multimedia communication, such as a text, image and/or video. In addition, in the case where a plurality of SUs are to receive the message, the dispatch server 152 may assign a group call I.D. as the blog I.D._Y. In such a case, the dispatch server 152 would initiate a group call to send a dispatch multimedia communication containing the message to each of the SUs identified by the group call I.D.

Once the dispatch server 152 has sent the dispatch multimedia communication 742, the dispatch server 152 initiates the termination of the dispatch communication link pursuant to messages 744 to 758. In this regard, the dispatch server 152 sends a SIP: INFO (open) message 744 to the gateway 106 by way of the external network 150. In response, the gateway 106 sends a FLOOR AVAIL. message 746 to the dispatch call controller 108 by way of the internal network 102. The dispatch call controller 108 then sends a FLOOR AVAIL. message 748 to the SU 116 by way of the internal network 102 and the base station 110. After sending the FLOOR AVAIL. message 746 to the dispatch call controller 108, the gateway 106 sends a SIP: 200 OK message 750 to the dispatch server 152 by way of the external network 150.

The dispatch server 152 then sends a SIP:BYE message 752 to the gateway 106 by way of the external network 150. In response, the gateway 106 sends a STOP message 754 to the dispatch call controller 108 by way of the internal network 102, instructing it to terminate the dispatch communication link. The gateway 106 also sends a SIP: 200 OK message 758 to the dispatch server 152 by way of the external network 150. In response to receiving the STOP message 754, the dispatch call controller 108 terminates the dispatch communication link. The dispatch call controller 108 also sends a COMPLETE message 756 to the SU 116 by way of the internal network 102 and base station 110, to inform it that the dispatch communication link has been terminated.

In this example, both dispatch multimedia communications 716 and 742 are within the same communication sessions. This is because there is a single call set up and call termination. However, it shall be understood that the dispatch multimedia communications 716 and 742 may be respectively in different communication sessions. This would entail having respective call set up and call termination for the dispatch multimedia communications 716 and 742.

Figure 8:
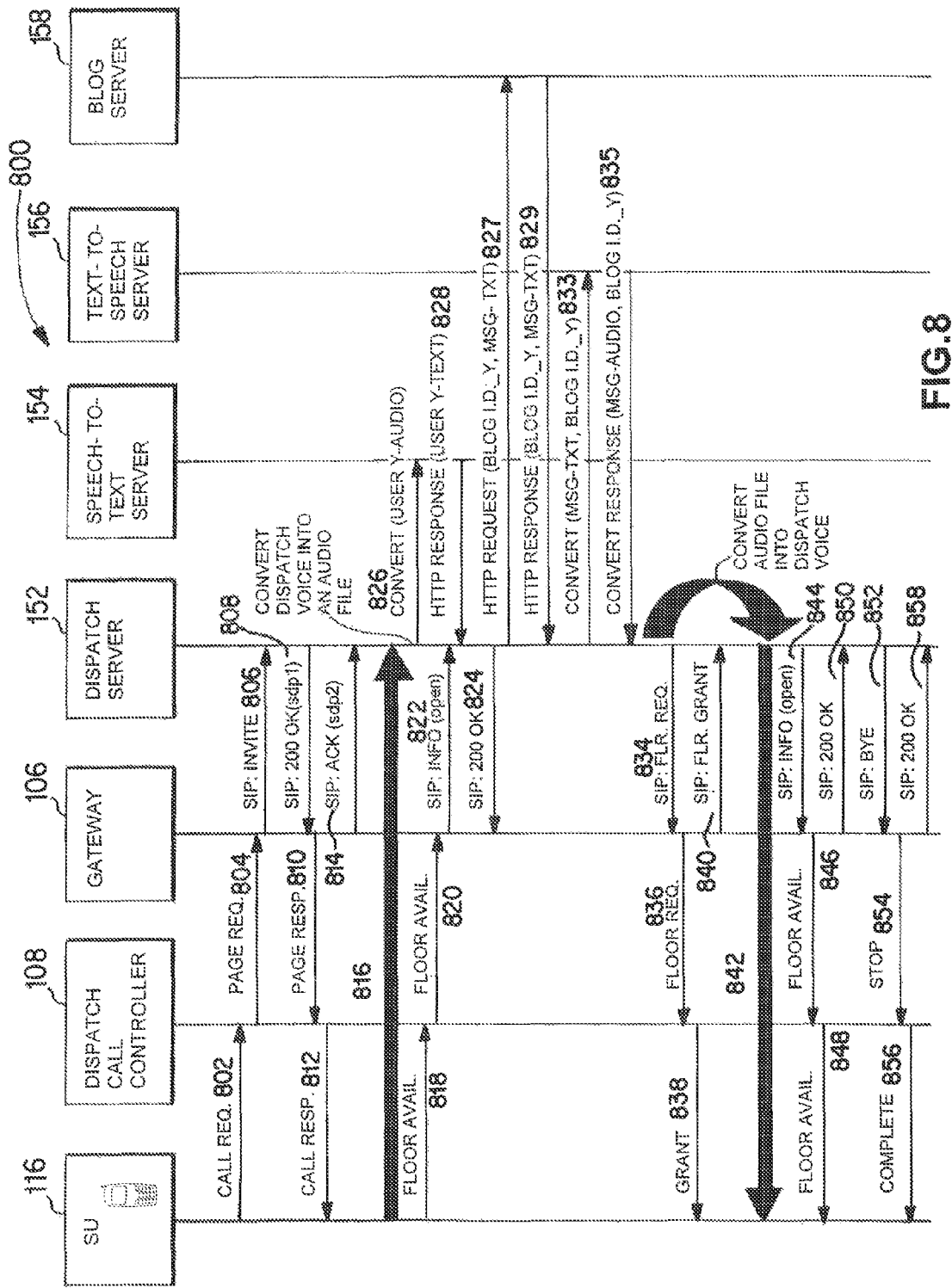
FIG. 8 illustrates a signal flow diagram related to another exemplary method of retrieving a posted message in accordance with another embodiment of the invention.

FIG. 8 illustrates a signal flow diagram related to another exemplary method 800 of retrieving a posted message in accordance with another embodiment of the invention. The method 800 is the same as method 700, except that the dispatch server 152 retrieves the posted message from the blog server 158 in text form, and then has it converted into audio form by the text-to-speech server 156. Messages of method 800 common with those of method 700 will be referred to with the same reference numbers except the most significant digit is an "8" instead of a "7". Accordingly, those common messages, having been discussed above in detail with reference to method 700, are not discussed in detail below with reference to method 800.

In summary, the method 800 entails the SU 116 initiating a dispatch communication link with the dispatch server 152; the SU 116 sending a dispatch multimedia communication to the dispatch server 152 via the dispatch communication link to inform it of the identity of user Y's blog and also identify the requested message(s) using a filtering parameter (e.g., date, time, subject, author, etc.); the dispatch server 152 converting the dispatch multimedia communication into an audio file; the dispatch server 152 sending the audio file to the speech-to-text server 154 and receiving therefrom a text file; the dispatch server 152 sending a request to the blog server 158 for the message using the information in the text file; the dispatch server 152 retrieving a text file of the requested message from the blog server 158; the dispatch server 152 then sending the text file to the text-to-speech 156 for conversion into an audio file, and then receiving the audio file therefrom; the dispatch server 152 then converting the audio file into a dispatch multimedia communication and sending it to the SU 116 via the dispatch communication link; and the dispatch server 152 initiating the termination of the dispatch communication link.

In particular, once the dispatch server 152 receives the dispatch multimedia communication containing the identity of user Y's blog from SU 116 pursuant to messages 802 to 824, the dispatch server 152 converts the dispatch multimedia communication into an audio file, and then has it converted into a text file pursuant to message 826 and 828. The dispatch server 152 then analyzes the text file 828 to parse the identity of the blog (e.g., the blog I.D._Y) from which the posted message is to be retrieved. Using the blog I.D._Y, the dispatch server 152 then sends a Request (Blog I.D._Y, Msg-Txt) 827 to the blog server 158 by way of the external network 150 for a text file containing the requested message posted on user Y's blog. The blog server 158 then obtains and sends the Response (blog I.D._Y, Msg-Txt) 829 to the dispatch server 152 by way of the external network 150. As discussed above with reference to method 500, the blog server 158 may authenticate the message retrieval request before sending the requested message to the dispatch server 152.

The dispatch server 152 then sends a Request (Msg-Txt, Blog I.D._Y) 833 to the text-to-speech server 156 by way of the external network 150 to convert the text message into an audio message. The text-to-speech server 156 then converts the text message into an audio message, and sends the Response (Msg-Audio, Blog I.D._Y) 835 to the dispatch server 152 by way of the external network 150. The dispatch server 152 then converts the audio file 835 into a dispatch multimedia communication, sends the dispatch multimedia communication 842 to the SU 116 via the dispatch communication link, and initiates the termination of the dispatch communication link pursuant to messages 844 to 858.

It shall be understood that the dispatch server 152 may provide the message to the SU 116 via another type of dispatch multimedia communication, such as a text, image and/or video. In addition, in the case where a plurality of SUs are to receive the message, the dispatch server 152 may assign a group call I.D. as the blog I.D._Y. In such a case, the dispatch server 152 would initiate a group call to send a dispatch multimedia communication containing the message to each of the SUs identified by the group I.D. and available to receive the communication.

In this example, both dispatch multimedia communications 816 and 842 are within the same communication sessions. This is because there is a single call set up and call termination. However, it shall be understood that the dispatch multimedia communications 816 and 842 may be respectively in different communication sessions. This would entail having respective call set up and call termination for the dispatch multimedia communications 816 and 842.

Figure 9A:
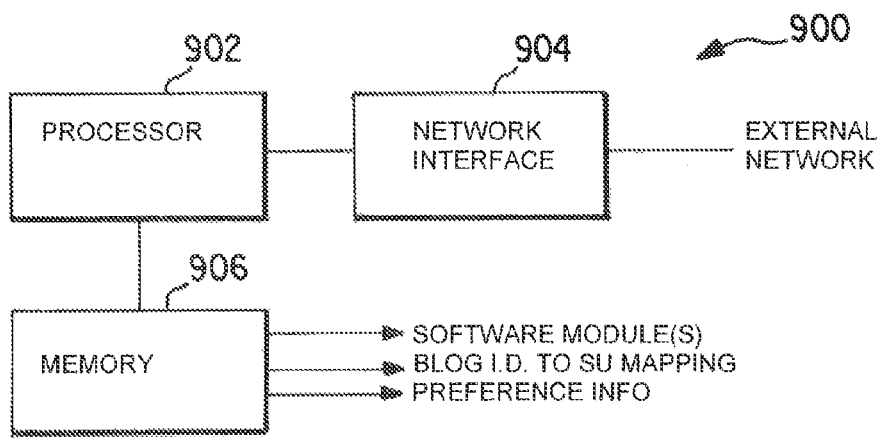
FIG. 9A illustrates a block diagram of an exemplary dispatch server in accordance with another embodiment of the invention.

FIG. 9A illustrates a block diagram of an exemplary dispatch server 900 in accordance with another embodiment of the invention. The dispatch server 900 may be a detailed version of the dispatch server 152 previously discussed. The dispatch server 900 comprises a processor 902, a network interface 904, and a memory 906. The processor 902 performs the various operations of the dispatch server 900 as discussed with reference to FIGS. 9B to 9H. The network interface 904 provides an interface to receive communications from and send communications to the external network 150. The memory 906, serving generally as a computer readable medium, stores one or more software modules that control the processor 902 in performing its various operations. The memory 906 may also store the blog I.D._Y for use in mapping the SU to user Y's blog, and preference information associated with SUs.

Figure 9B:
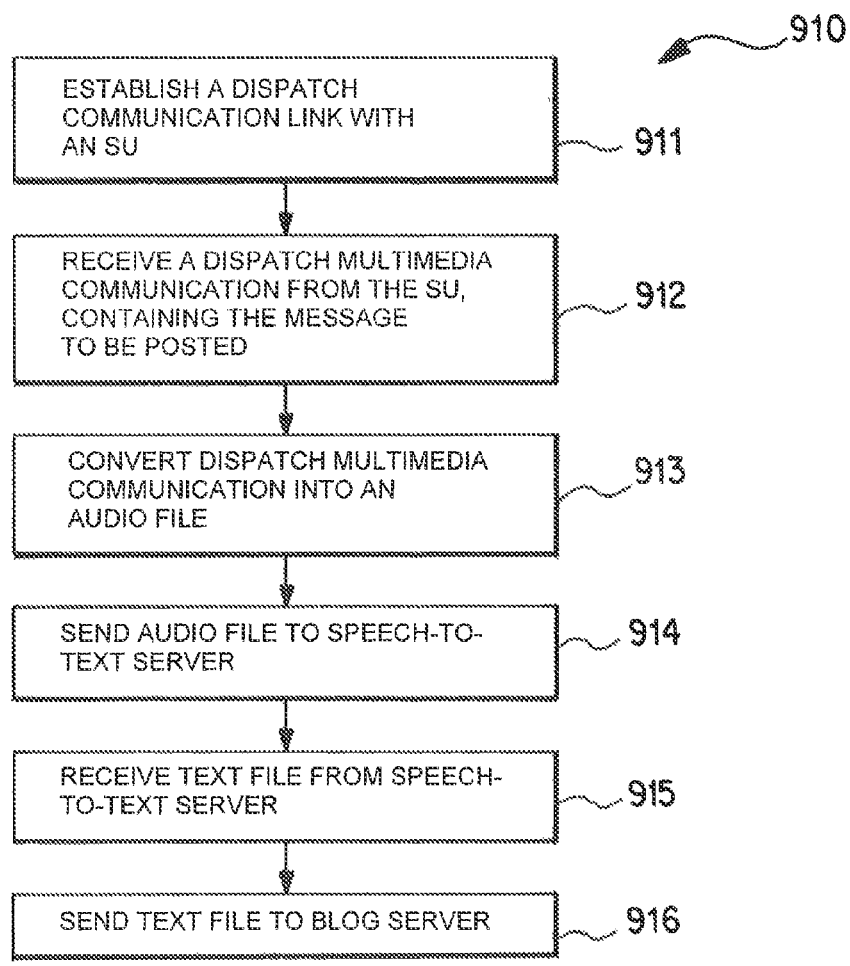
FIG. 9B illustrates a flow diagram of an exemplary method of assisting in the posting of a message by the exemplary dispatch server in accordance with another embodiment of the invention.

FIG. 9B illustrates a flow diagram of an exemplary method 910 of assisting in the posting of a message by the exemplary dispatch server 900 in accordance with another embodiment of the invention. According to the method 910, the processor 902 sends one or more messages to a wireless communication system by way of the network interface 904 to establish a dispatch communication link with an SU desiring to post a message on user Y's blog webpage (block 911). Once the dispatch communication link is set up, the processor 902 receives by way of the network interface 904 a dispatch multimedia communication containing the message to be posted (block 912). In this example, the multimedia format is audio. However, it shall be understood that the multimedia format could be text, image and/or video.

Once the processor 904 has received the dispatch multimedia communication, it converts the communication into an audio file containing the message to be posted (block 913). The audio file may be in any number of different formats, such as .wav and .mp3. The processor 902 then sends a request including the audio file by way of the network interface 904 to a speech-to-text server in order to have the audio file converted into a text file (block 914). The processor 902 then receives the text file, that now contains the message to be posted in text, from the speech-to-text server by way of the network interface 904 (block 915). The processor 902 then analyzes the text file to parse the identity of the blog (e.g., the blog I.D._Y) to which the message is to be posted. Using the blog I.D._Y, the processor 902 then sends the text file to the blog server by way of the network interface 904 for posting (block 916). As discussed above, the processor 902 may also send the message to the blog server as an audio, image, and/or video file.

Figure 9C:
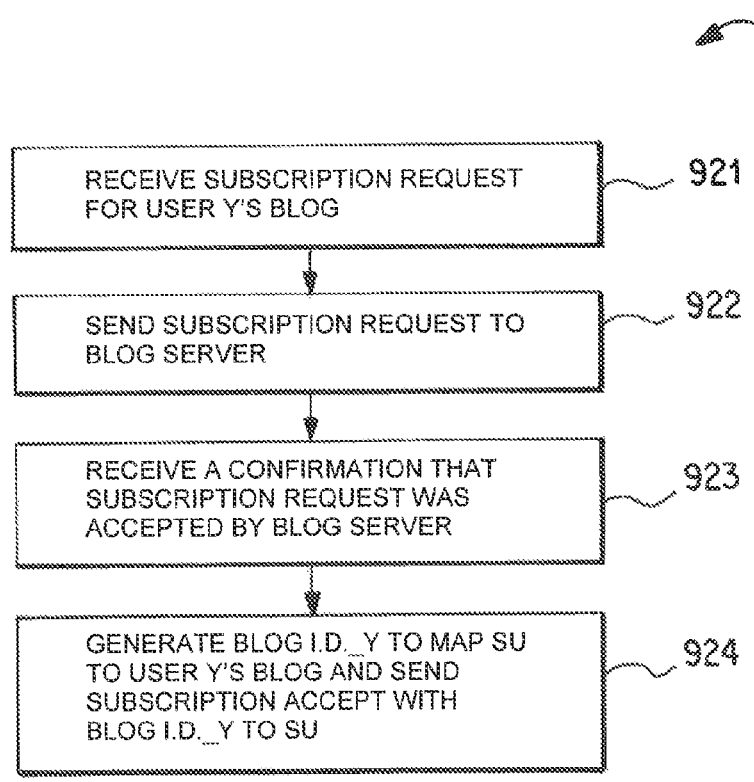
FIG. 9C illustrates a flow diagram of an exemplary method of assisting in the subscribing of a subscriber unit to receive user Y's blog service by the exemplary dispatch server in accordance with another embodiment of the invention.

FIG. 9C illustrates a flow diagram of an exemplary method 920 of assisting in the subscribing of a subscriber unit to receive user Y's blog services (such as the automatic notification of the posting of messages) in accordance with another embodiment of the invention. According to the method 920, the processor 902 receives a message by way of the network interface 904, requesting a subscription to user Y's blog service by the SU (block 921). The processor 902 then sends by way of the network interface 904 the subscription request to the blog server maintaining the user Y's blog (block 922). The processor 902 then receives by way of the network interface 904 a confirmation that the subscription has been accepted by the blog server (block 923). Then, the processor 902 generates a blog I.D._Y that maps the requesting SU to user Y's blog, and then sends the subscription accept message including the blog I.D._Y to the SU by way of the network interface 904 (block 924).

Figure 9D:
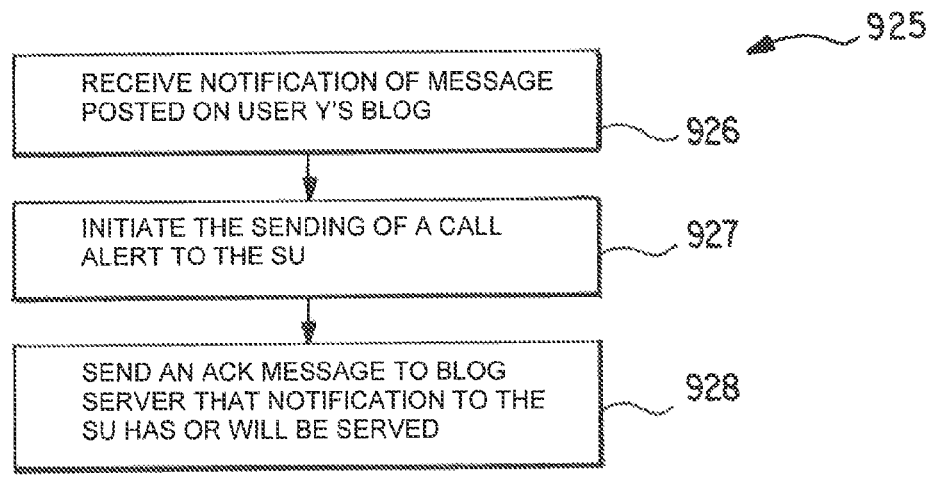
FIG. 9D illustrates a flow diagram of an exemplary method of assisting in the notification of a subscriber unit (SU) of the posting of a blog message by the exemplary dispatch server in accordance with another embodiment of the invention.

FIG. 9D illustrates a flow diagram of an exemplary method 925 of assisting in the notification of a subscriber unit (SU) of the posting of a blog message by the exemplary dispatch server in accordance with another embodiment of the invention. Once the SU is registered to receive user Y's blog services, the SU may now receive automatic notifications of new messages posted on user Y's blog webpage. Accordingly, when a new message is posted on user Y's blog webpage, the blog server sends a notification to the dispatch server. In this regard, the processor 902 receives by way of the network interface 904 a notification that a new message has been posted on user Y's blog webpage (block 926). The processor 902 maps user Y's information to the SU using blog I.D._Y, and then sends by way of the network interface 904 a message including the blog I.D._Y to the wireless communication system instructing it to send a call alert to SU (block 927). The processor 902 then sends by way of the network interface 904 a message to the blog server acknowledging that the SU has been or will be notified of the posting of the message (block 928). In the case where a plurality of SUs are to receive the notification, the processor 902 may assign a group call I.D. as the blog I.D._Y. In such a case, the processor would initiate a group call to send call alerts carrying the notification to each of the SUs identified by the group call I.D.

Figure 9E:
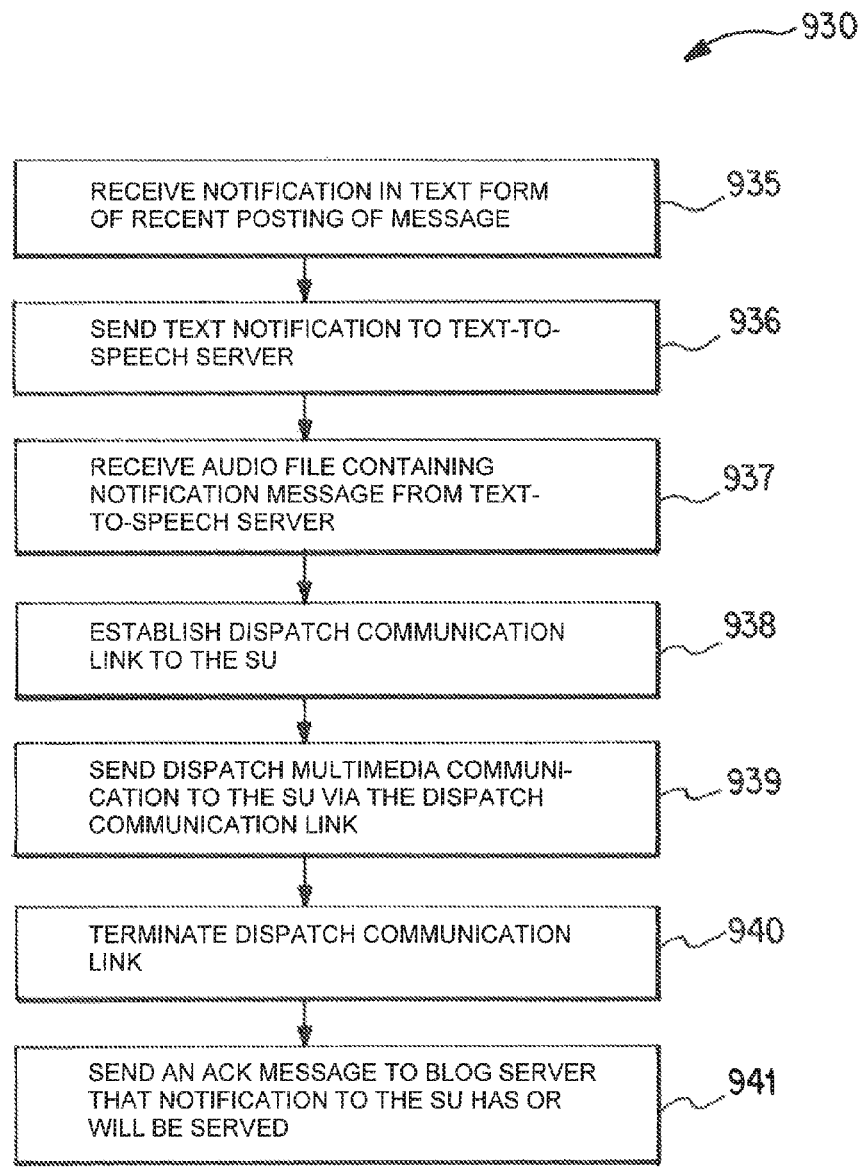
FIG. 9E illustrates a flow diagram of another exemplary method of assisting in the notification of a subscriber unit (SU) of the posting of a blog message by the exemplary dispatch server in accordance with another embodiment of the invention.

FIG. 9E illustrates a flow diagram of another exemplary method 930 of assisting in the notification of a subscriber unit (SU) of the recent posting of a blog message in accordance with another embodiment of the invention. According to the method 930, once the SU is registered to receive user Y's blog services, it is able to receive automatic notifications of new messages posted on user Y's blog webpage. Accordingly, when a new message is posted on user Y's blog webpage, the blog server sends a text notification to the dispatch server. In this regard, the processor 902 receives by way of the network interface 904 the text notification indicating that a new message has been posted on user Y's blog webpage with the associated URL or other identifier of the message (block 935). The processor 902 then sends by way of the network interface 904 a request including the text notification to a text-to-speech server to convert the text message into an audio file (block 936). The processor 902 then receives by way of the network interface 904 the audio file from the text-to-speech server (block 937).

The processor 902 then sends by way of the network interface 904 a message to the wireless communication system to set up a dispatch communication link to the SU (block 938). The processor 902 then sends by way of the network interface 904 a dispatch multimedia communication containing the audio notification to the SU by way of the dispatch communication link (block 939). It shall be understood that the dispatch server 152 may provide such notification to the SU 116 via another type of dispatch multimedia communication, such as a text, image and/or video. In addition, in the case where a plurality of SUs are to receive the notification, the processor 902 may assign a group call I.D. as the blog I.D._Y. In such a case, the processor 902 would initiate a group call to send a dispatch multimedia communication containing the notification to each of the SUs identified by the group call I.D.

The processor 902 then sends by way of the network interface 904 a message to the wireless communication system to terminate the dispatch communication link (block 940). The processor 902 then sends a message by way of the network interface 904 to the blog server acknowledging that the SU has been or will be notified of the posting of the message (block 941).

Figure 9F:
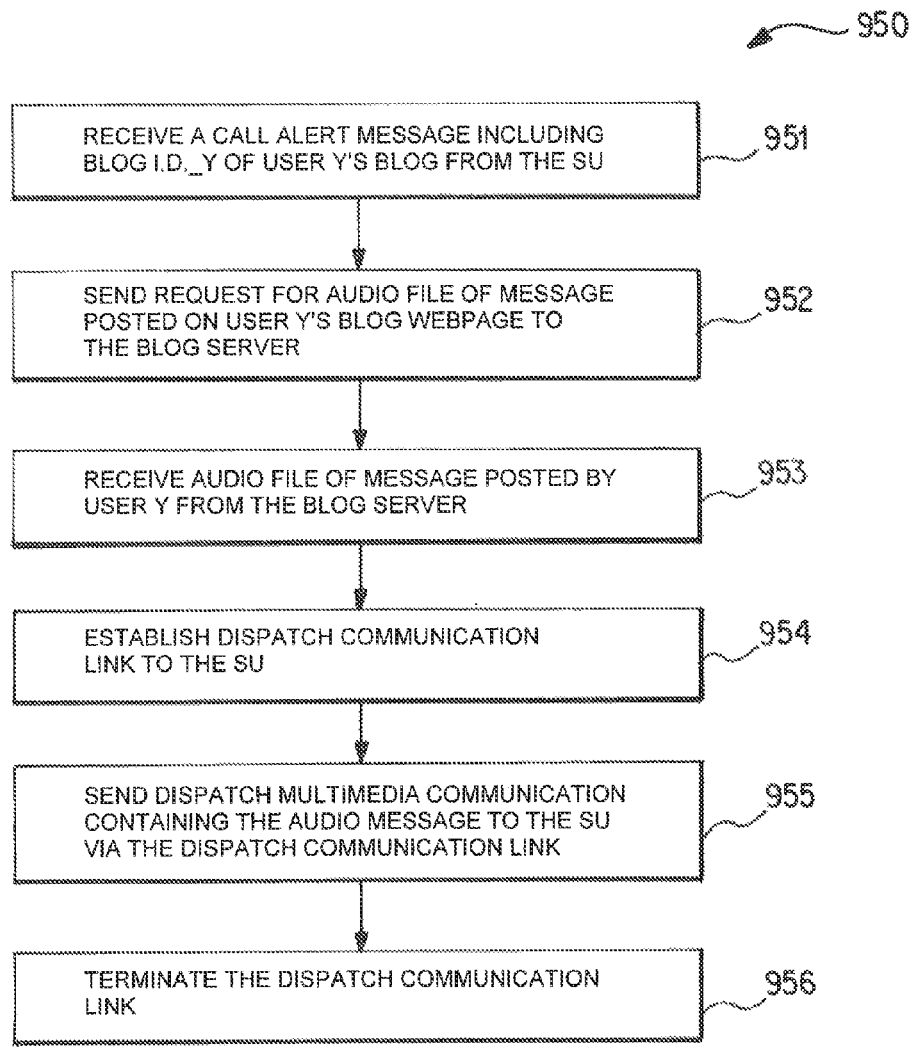
FIGS. 9F through 9I illustrate flow diagrams of various exemplary methods of assisting in the delivery of a posted message to a requesting subscriber unit by the exemplary dispatch server in accordance with other embodiments of the invention.

FIG. 9F illustrates a flow diagram of an exemplary method 950 of assisting in the delivery of a posted message to a requesting subscriber unit (SU). According to the method 950, the processor 902 receives by way of the network interface 904 a call alert message including the blog I.D._Y of user Y's blog from the requesting SU (block 951). The processor 902 translates the blog I.D._Y into user Y's blog address (e.g., a Uniform Resource Locator (URL)). The processor 902 sends a request by way of the network interface 904 to the blog server for an audio file containing a message posted on user Y's blog webpage (block 952). The processor 902 then receives by way of the network interface 904 the requested audio file from the blog server (block 953).

The processor 902 then sends by way of the network interface 904 a message to the wireless communication system to establish a dispatch communication link to the requesting SU (block 954). Once the dispatch communication link is established, the processor 902 converts the audio file into a dispatch multimedia communication and sends it by way of the network interface 904 to the SU via of the dispatch communication link (block 955). Once the dispatch multimedia communication has been sent, the processor 902 sends by way of the network interface 904 a message to the wireless communication system to terminate the dispatch communication link (block 956).

In the case where a plurality of SUs are to receive the message, the processor 902 may assign a group call I.D. as the blog I.D._Y. In such a case, the processor 902 would initiate a group call to send a dispatch multimedia communication containing the message to each of the SUs identified by the group I.D. and available to receive the communication.

Figure 9G:
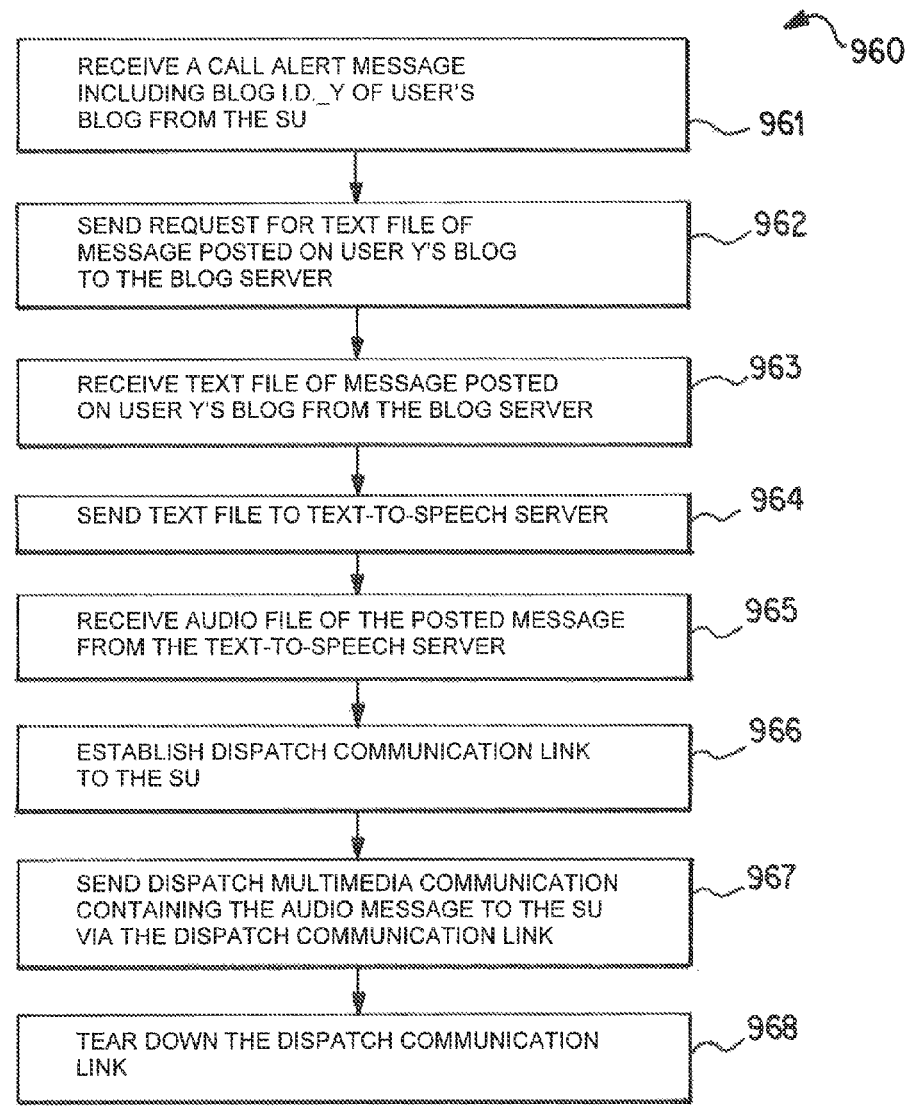

FIG. 9G illustrates a flow diagram of an exemplary method 960 of assisting in the delivery of a posted message to a requesting subscriber unit (SU). According to the method 960, the processor 902 receives by way of the network interface 904 a call alert message including the blog I.D._Y of user Y's blog from the requesting SU (block 961). The processor 902 then sends a request by way of the network interface 904 to the blog server for a text file containing a message posted on user Y's blog webpage (block 962). The processor 902 then receives by way of the network interface 904 the requested text file from the blog server (block 963).

The processor 902 then sends by way of the network interface 904 a message including the text file to a text-to-speech server requesting a conversion of the text file into an audio file (block 964). The processor 902 then receives by way of the network interface 904 the audio file from the text-to-speech server (block 965).

The processor 902 then sends by way of the network interface 904 a message to the wireless communication system to establish a dispatch communication link to the requesting SU (block 966). Once the dispatch communication link is established, the processor 902 converts the audio file into a dispatch multimedia communication and sends it by way of the network interface 904 to the SU via of the dispatch communication link (block 967). Once the dispatch multimedia communication has been sent, the processor 902 sends by way of the network interface 904 a message to the wireless communication system to terminate the dispatch communication link (block 968).

It shall be understood that the processor 902 may provide the message to the SU 116 via another type of dispatch multimedia communication, such as a text, image and/or video. In addition, in the case where a plurality of SUs are to receive the message, the processor 902 may assign a group call I.D. as the blog I.D._Y. In such a case, the processor 902 would initiate a group call to send a dispatch multimedia communication containing the message to each of the SUs identified by the group call I.D. and available to receive the communication.

Figure 9H:
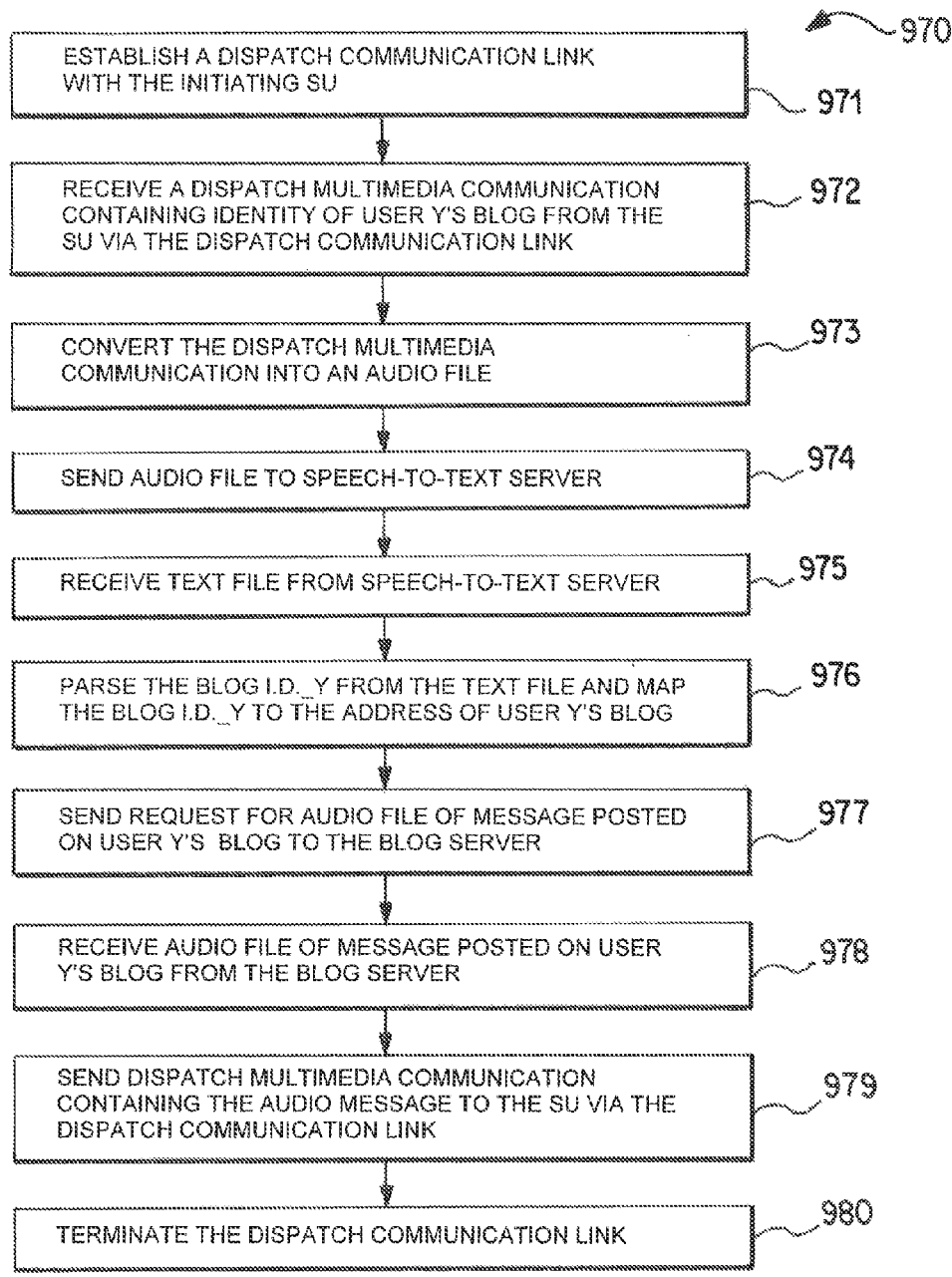
Figure 9:
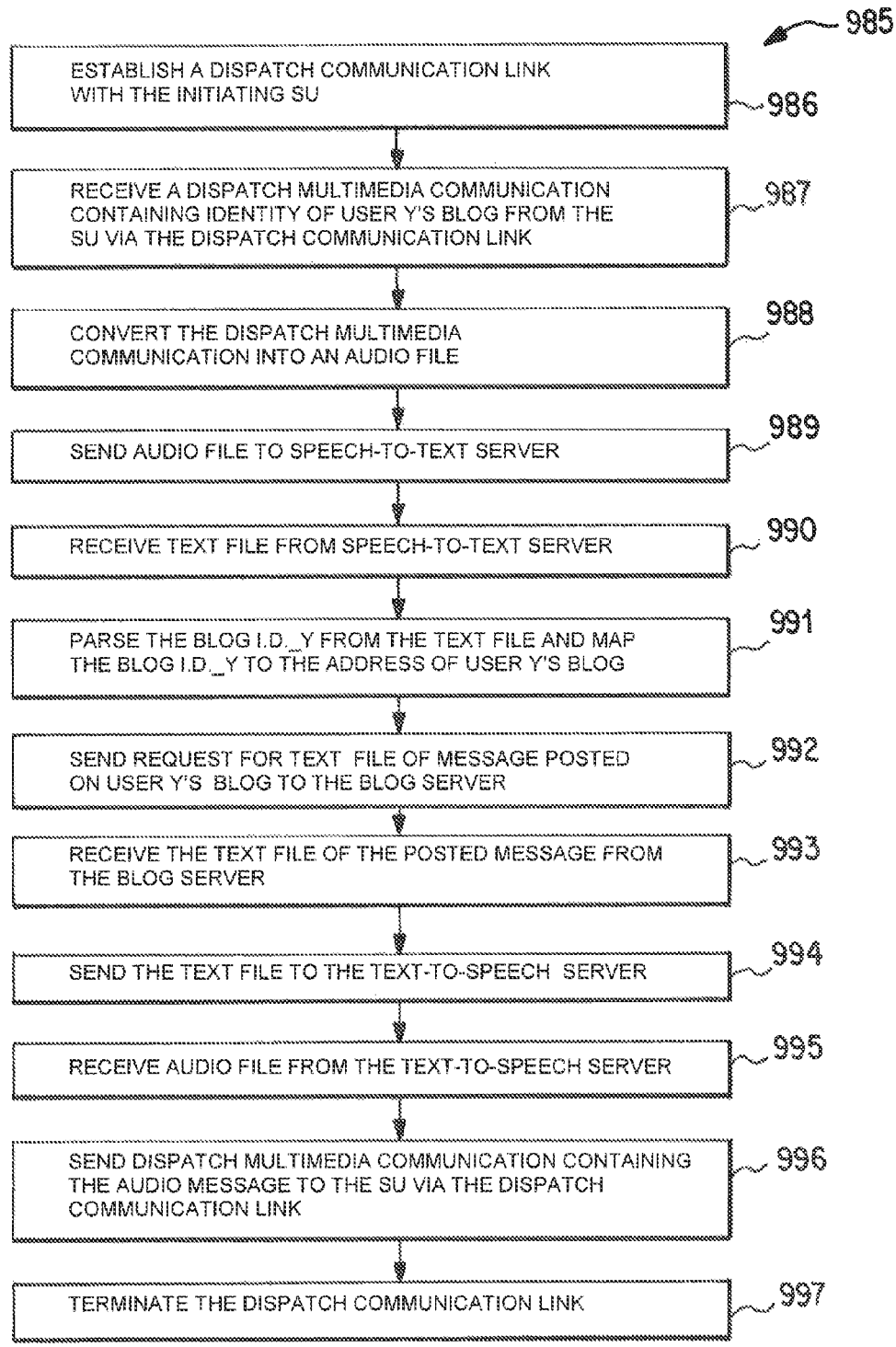

FIG. 9H illustrates a flow diagram of an exemplary method 970 of assisting in the delivery of a posted message to a requesting subscriber unit (SU). According to the method 970, the processor 902 sends by way of the network interface 904 a message to the wireless communication system to establish a dispatch communication link with the SU (block 971). The SU, in this case, initiates the dispatch communication link. The processor 902 then receives by way of the network interface 904 a dispatch multimedia communication containing information that identifies user Y's blog from the SU via the dispatch communication link (block 972). The processor 902 then converts the dispatch multimedia communication into an audio file (block 973).

Once this conversion has taken place, the processor 902 sends by way of the network interface 904 the audio file to the speech-to-text server to convert the audio file into a text file (block 974). The processor 902 then receives by way of the network interface 904 the text file from the speech-to-text server (block 975). The processor 902 then analyzes the text file to parse the identity of user Y's blog (e.g., the blog I.D._Y) and maps the identity into an address associated with the requested message on user Y's blog (block 976). Using the mapped address, the processor 902 sends by way of the network interface 904 a message to the blog server requesting an audio file of a message posted on user Y's blog (block 977). The processor 902 then receives by way of the network interface 904 the audio file from the blog server (block 978).

The processor 902 then converts the audio file into a dispatch multimedia communication and sends it by way of the network interface 904 to the SU via the dispatch communication link (block 979). Once the dispatch multimedia communication is delivered to the SU, the processor 902 sends by way of the network interface 904 a message to the wireless communication system to terminate the dispatch communication link (980).

It shall be understood that the processor 902 may provide the message to the SU 116 via another type of dispatch multimedia communication, such as a text, image and/or video. In addition, in the case where a plurality of SUs are to receive the message, the processor 902 may assign a group call I.D. as the blog I.D._Y. In such a case, the processor 902 would initiate a group call to send a dispatch multimedia communication containing the message to each of the SUs identified by the group call I.D. and available to receive the communication.

FIG. 9I illustrates a flow diagram of an exemplary method 985 of assisting in the delivery of a posted message to a requesting subscriber unit (SU). According to the method 985, the processor 902 sends by way of the network interface 904 a message to the wireless communication system to establish a dispatch communication link with the SU (block 986). The SU, in this case, initiates the dispatch communication link. The processor 902 then receives by way of the network interface 904 a dispatch multimedia communication containing information that identifies user Y's blog from the SU via the dispatch communication link (block 987). The processor 902 then converts the dispatch multimedia communication into an audio file (block 988).

Once this conversion has taken place, the processor 902 sends by way of the network interface 904 the audio file to the speech-to-text server to convert the audio file into a text file (block 989). The processor 902 then receives by way of the network interface 904 the text file from the speech-to-text server (block 990). The processor 902 then analyzes the text file to parse the identity associated with user Y's blog (e.g., the blog I.D._Y) and maps the identity into an address associated with the requested message on user Y's blog (block 991). Using the mapped address, the processor 902 then sends by way of the network interface 904 a message to the blog server requesting a text file of a message posted on user Y's blog webpage (block 992). The processor 902 then receives by way of the network interface 904 the text file containing the message posted on user Y's blog from the blog server (block 993).

The processor 902 then sends by way of the network interface 904 the text file to the text-to-speech server for conversion into an audio file (block 994). Then the processor 902 receives by way of the network interface 904 the audio file from the text-to-speech server (995). The processor 902 then converts the audio file into a dispatch multimedia communication and sends it by way of the network interface 904 to the SU via the dispatch communication link (block 996). Once the dispatch multimedia communication is delivered to the SU, the processor 902 sends by way of the network interface 904 a message to the wireless communication system to terminate the dispatch communication link (997).

It shall be understood that the processor 902 may provide the message to the SU 116 via another type of dispatch multimedia communication, such as a text, image and/or video. In addition, in the case where a plurality of SUs are to receive the message, the processor 902 may assign a group call I.D. as the blog I.D._Y. In such a case, the processor 902 would initiate a group call to send a dispatch multimedia communication containing the message to each of the SUs identified by the group call I.D. and available to receive the communication.

Figure 10A:
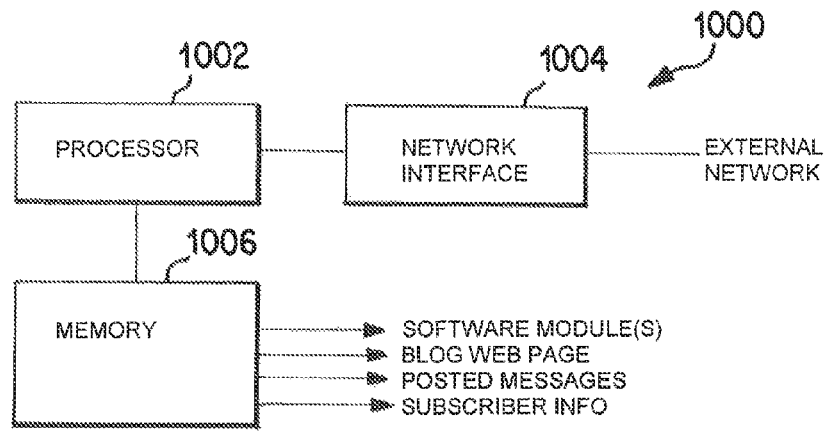
FIG. 10A illustrates a block diagram of an exemplary blog server in accordance with another embodiment of the invention.

FIG. 10A illustrates a block diagram of an exemplary blog server 1000 in accordance with another embodiment of the invention. The blog server 1000 may be a detailed version of the blog server 158 previously discussed. The blog server 1000 comprises a processor 1002, a network interface 1004, and a memory 1006. The processor 1002 performs the various operations of the blog server 1000 as discussed with reference to FIGS. 10B to 10D. The network interface 1004 provides an interface to receive communications from and send communications to the external network 150. The memory 1006, serving generally as a computer readable medium, stores one or more software modules that control the processor 1002 in performing its various operations, as well as blog webpages, posted messages, subscriber information, and possibly other blog related information and parameters.

Figure 10B:
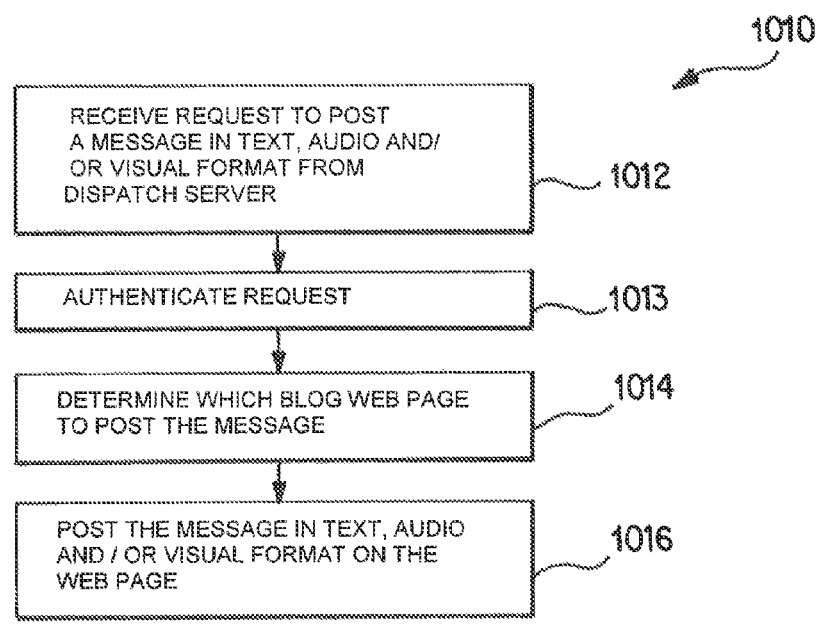
FIG. 10B illustrates a flow diagram of an exemplary method of posting a message by the exemplary blog server in accordance with another embodiment of the invention.

FIG. 10B illustrates a flow diagram of an exemplary method 1010 of posting a message by the blog server 1000 in accordance with another embodiment of the invention. According to the method 1010, the processor 1002 receives by way of the network interface 1004 a request to post a message in text, audio, and/or visual format(s) on a blog webpage from a dispatch server (block 1012). The processor then attempts to authenticate the request to determine whether to proceed with the posting of the message (block 1013). In making this determination, the processor 1002 may access the local memory 1006 for credential information related to the candidate subscriber. Alternatively, the processor 1002 may send a query for such credential information to an external server by way of the network interface 1004, and subsequently receive the information from the external server. Yet another alternative is for the processor 1002 to send an approval request to the owner of the blog, user Y, (via email, dispatch or other communication type) requesting approval to provide blog services to the candidate subscriber.

If the processor 1012 authenticates the message, the processor 1002 determines which blog webpage to post the received message using user Y's blog identity information accompanying the message (block 1014). The processor 1004 then posts the message in which ever format it is in (e.g., text, audio, and/or visual) on the appropriate blog webpage (block 1016).

Figure 10C:
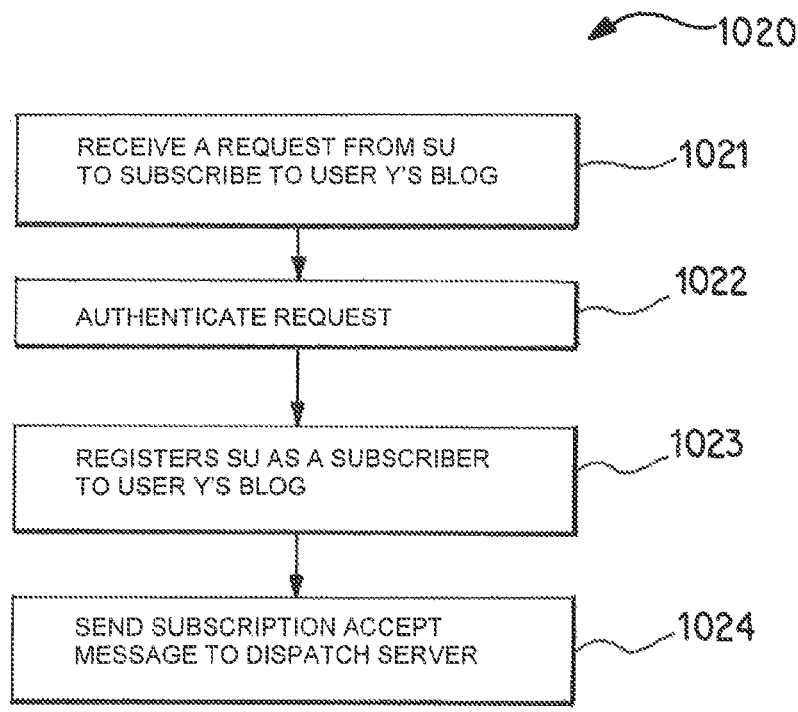
FIG. 10C illustrates a flow diagram of an exemplary method of registering a subscriber unit for user Y's blog services by the exemplary blog server in accordance with another embodiment of the invention.
Figure 10:
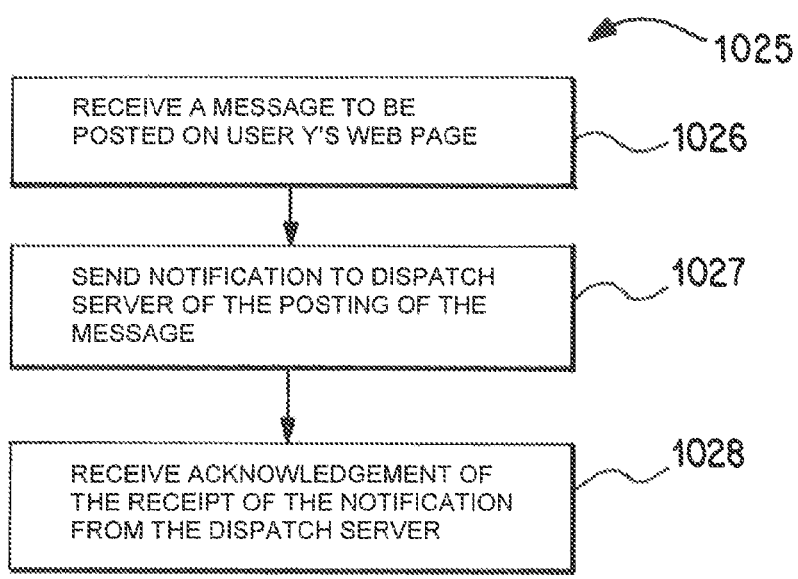
FIG. 10D illustrates a flow diagram of an exemplary method of notifying a registered subscriber unit of a message posted on a webpage by the exemplary blog server in accordance with another embodiment of the invention.
FIG. 10E illustrates a flow diagram of an exemplary method of sending a requested message to a subscriber unit by the exemplary blog server in accordance with another embodiment of the invention.
Figure 10:
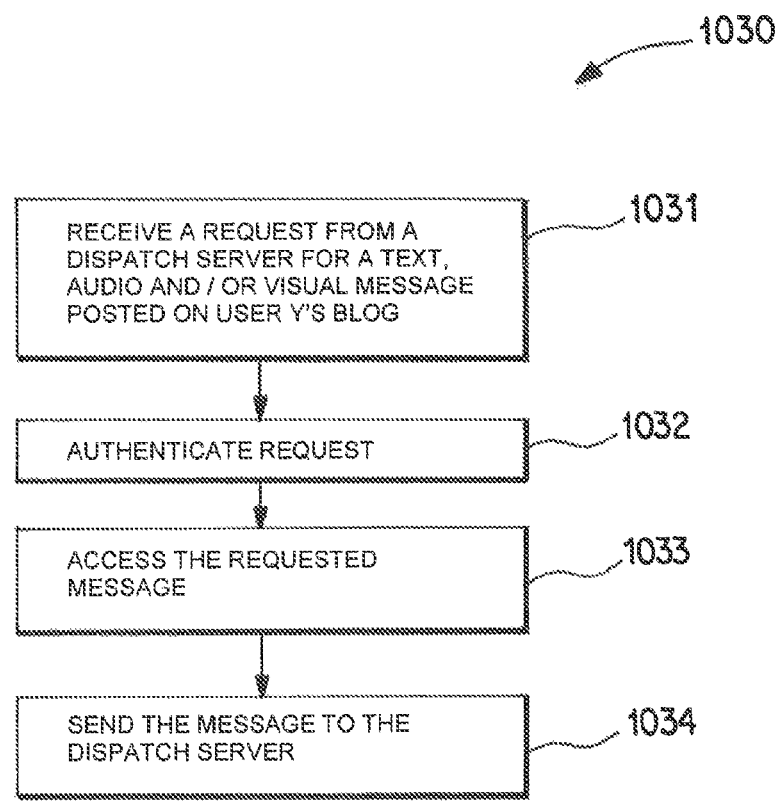

FIG. 10C illustrates a flow diagram of an exemplary method 1020 of registering a subscriber unit (SU) for user Y's blog services by the exemplary blog server 1000 in accordance with another embodiment of the invention. According to the method 1020, the processor 1002 receives by way of the network interface 1004 a request from SU by way of a dispatch server to subscribe to user Y's blog (block 1021). In response to the subscription request, the processor 1002 attempts to authenticate the subscription request to determine whether the subscriber is eligible to receive blog services from user Y's blog (block 1022). In making this determination, the processor 1002 may access the local memory 1006 for credential information related to the candidate subscriber. Alternatively, the processor 1002 may send a query for such credential information to an external server by way of the network interface 1004, and subsequently receive the information from the external server. Yet another alternative is for the processor 1002 to send an approval request to the owner of the blog, user Y, (via email, dispatch or other communication type) requesting approval to provide blog services to the candidate subscriber.

If the processor 1002 authenticates the subscription request, the processor 1002 then registers SU as a subscriber of user Y's blog (block 1023). This may entail the processor 1002 creating and storing a subscriber data object in the local memory 1006. The processor 1002 then sends by way of the network interface 1004 a subscription accept message to the SU by way of the dispatch server (block 1024).

FIG. 10D illustrates a flow diagram of an exemplary method 1025 of notifying a registered subscriber unit of a message posted on a webpage by the exemplary blog server 1000 in accordance with another embodiment of the invention. According to the method 1025, once the SU has registered for user Y's blog services, when the processor 1002 receives a message to be posted on user Y's blog webpage by way of the network interface 1004 (block 1026), the processor 1002 sends by way of the network interface 1004 a notification regarding the recent posting of the message to the SU via the dispatch server (block 1027). The processor 1002 then receives by way of the network interface 1004 an acknowledgement of the receipt of the notification by the SU or an acknowledgement that SU is to receive the notification (block 1028).

It shall be understood that the processor 1002 may notify a user of the SU 116 of the posting of a message in many other ways apart from sending a dispatch communication to the SU 116 via a dispatch server. For example, the processor 1002 may send an email containing such notification to the user of SU 116 by way of the network interface 1004. The email may be sent to an email address designated by the user of SU 116. The email may be downloaded by the SU 116 itself or some other device. As another example, the processor 1002 may also notify the user of SU 116 by sending a Short Messaging Service (SMS) message to the user by way of the network interface. The SMS message may be received by the SU 116 itself or some other device.

FIG. 10E illustrates a flow diagram of an exemplary method 1030 of sending a requested message to an SU in accordance with an embodiment of the invention. According to the method 1030, the processor 1002 receives by way of the network interface 1004 a request from a dispatch server for a text, audio and/or visual message posted on user Y's blog webpage (block 1031).

The processor 1002 then attempts to authenticate the message retrieval request to determine whether the requesting entity is eligible to receive the message (block 1032). In making this determination, the processor 1002 may access the local memory 1006 for credential information related to the requesting entity. Alternatively, the processor 1002 may send a query for such credential information to an external server by way of the network interface 1004, and subsequently receive the information from the external server by way of the network interface 1004. Yet another alternative is for the processor 1002 to send an approval request to the owner of the blog, user Y, (via email, dispatch or other communication type) by way of the network interface 1004 requesting approval to send the message to the requesting entity.

Once it has authenticated the message retrieval request. In response, the processor 1002 accesses the requested message from memory 1006 (block 1033). The processor 1002 then sends by way of the network interface 1004 the requested message to the dispatch server (block 1034).

Figure 11:
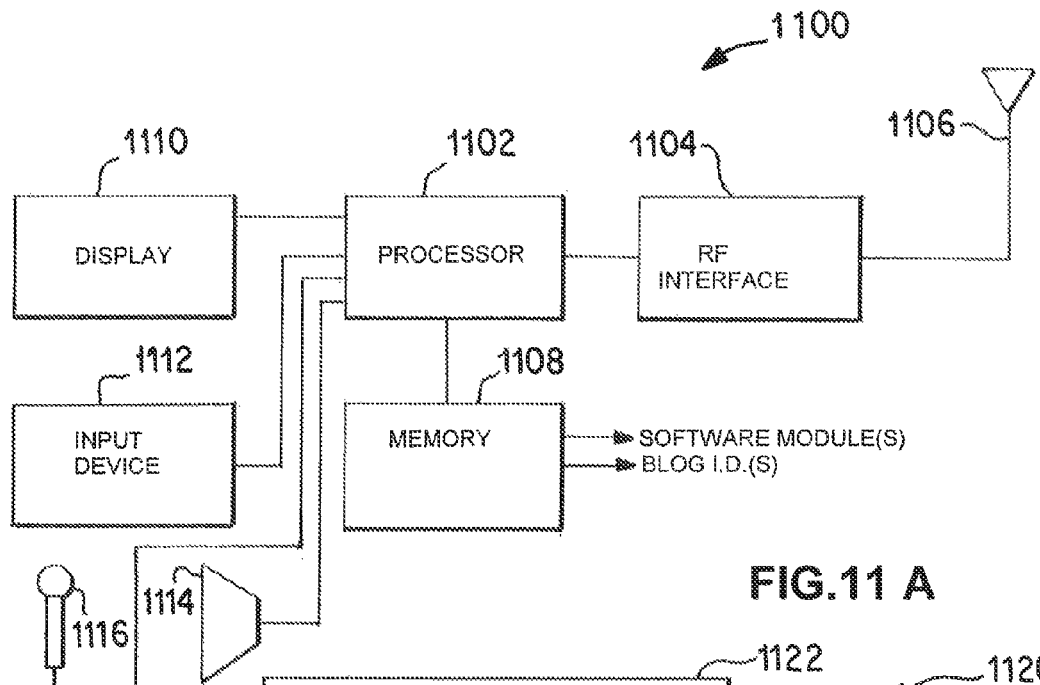
FIG. 11A illustrates a block diagram of an exemplary subscriber unit in accordance with another embodiment of the invention.
FIG. 11B illustrates a block diagram of an exemplary method of subscribing to user Y's blog service by the exemplary subscriber unit in accordance with another embodiment of the invention.
FIG. 11C illustrates a flow diagram of an exemplary method of receiving a notification of the posting of a message by the exemplary subscriber unit in accordance with another embodiment of the invention.
FIG. 11D illustrates a flow diagram of another exemplary method of receiving a notification of the posting of a message by the exemplary subscriber unit in accordance with another embodiment of the invention.
FIG. 11E illustrates a flow diagram of an exemplary method of retrieving a message posted on a webpage by the exemplary subscriber unit in accordance with another embodiment of the invention.
FIG. 11F illustrates a flow diagram of another exemplary method of retrieving a message posted on a webpage by the exemplary subscriber unit in accordance with another embodiment of the invention.
FIG. 11G illustrates a flow diagram of an exemplary method of posting a message on a blog webpage by the exemplary subscriber unit in accordance with another embodiment of the invention.
Figure 11:
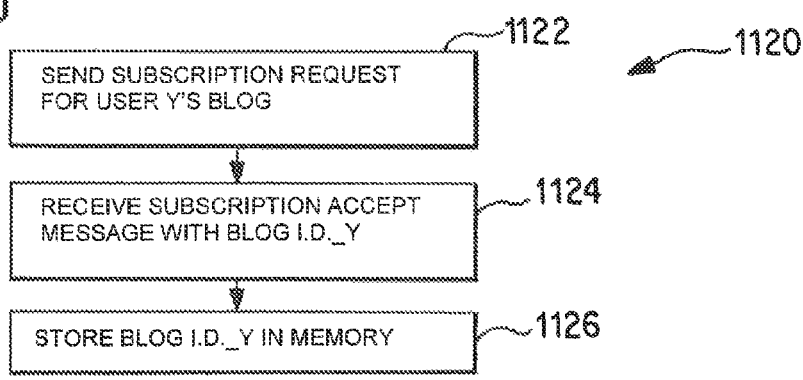
Figure 11:
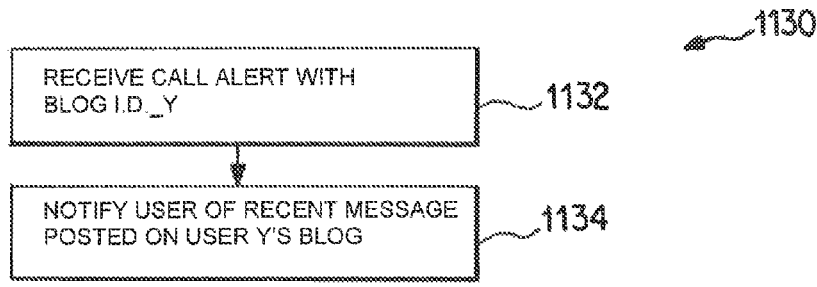
Figure 11:
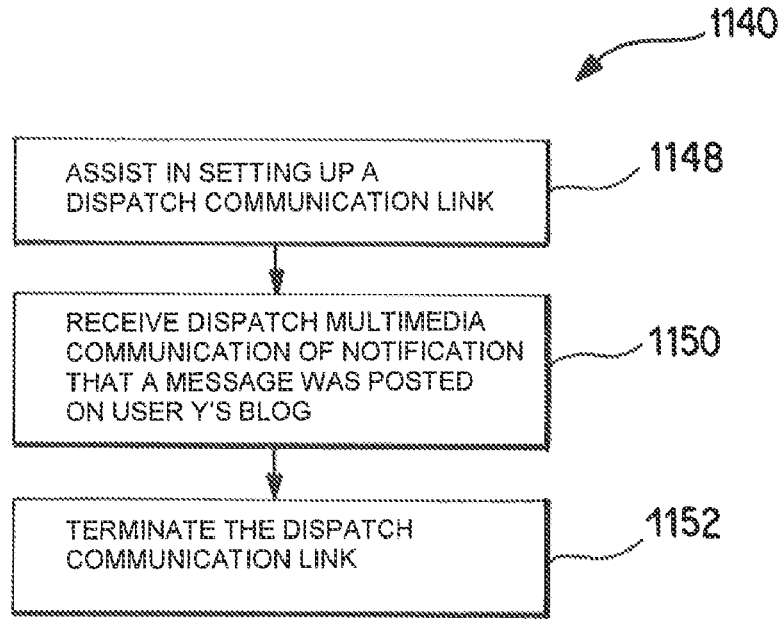
Figure 11:
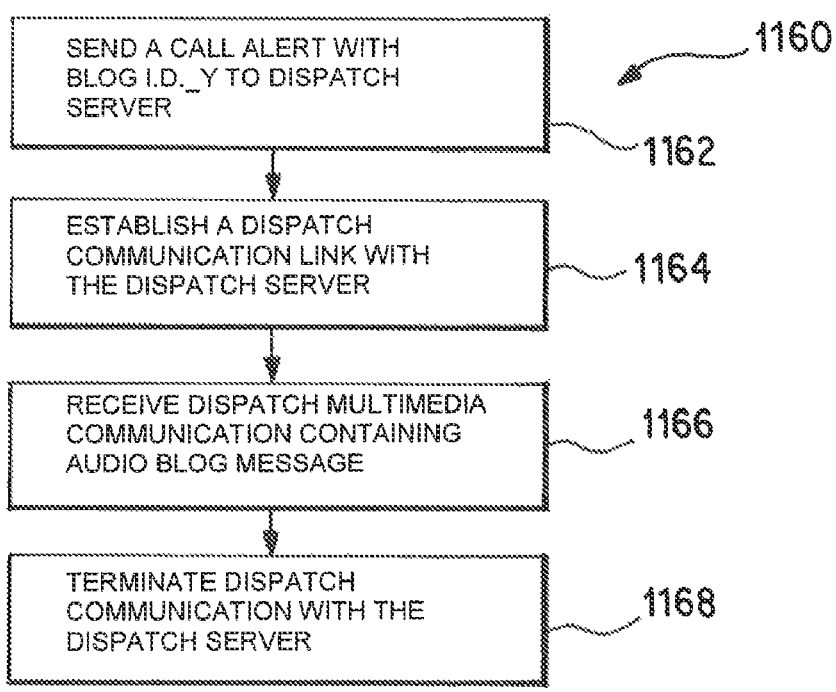
Figure 11:
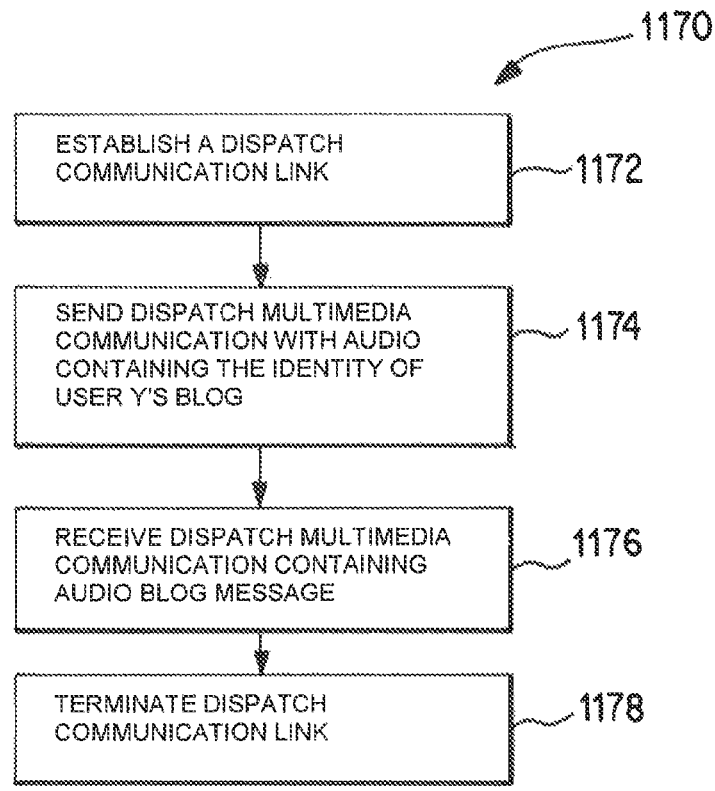
Figure 11:
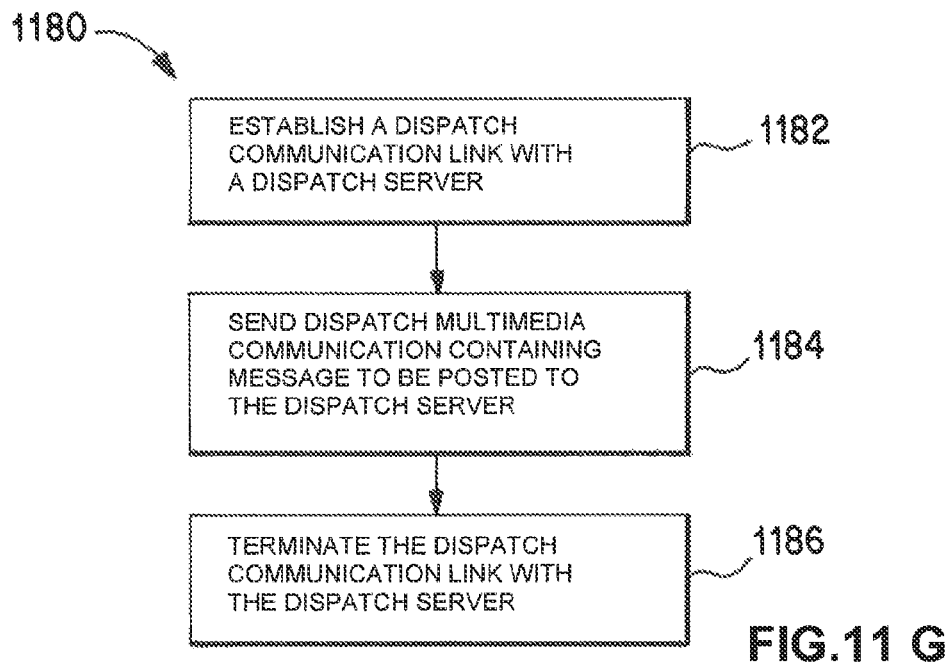

FIG. 11A illustrates a block diagram of an exemplary subscriber unit (SU) 1100 in accordance with another embodiment of the invention. The SU 1100 comprises a processor 1102, a radio frequency (RF) interface 1104 including an antenna 1106, a memory 1108, a display 1110, an input device (e.g., a keyboard) 1112, a speaker 1114, and a microphone 1116. The processor 1102 performs the various operations of the SU 1100 as described with reference to FIGS. 11B to 11E. The RF interface 1104 and the antenna 1106 provide a wireless interface to send communications to and receive communications from a wireless communication system. If the SU 1100 is connected to the external network 150, as in the case of a dispatch-to-desktop device, the RF interface 1104 and antenna 1106 may be replaced with a network interface.

The memory 1108, serving generally as a computer readable medium, stores one or more software modules that control the processor 1102 in performing its various operations. The display 1110 provides a user of the SU 1100 with visual information. The input device 1112 allows the user of the SU 1100 to enter information. It shall be understood that the display 1110 and the input device 1112 may be integrated, such as a touch-sensitive display. The speaker 1114 allows the SU 1100 to provide audio information to the user. The microphone 1116 allows the SU 1100 to receive audio information from the user. The following describes various exemplary methods implemented by the SU 1100.

FIG. 11B illustrates a block diagram of an exemplary method 1120 of subscribing to user Y's blog service by the exemplary subscriber unit 1100 in accordance with another embodiment of the invention. According to the method 1120, the processor 1102 sends a message to a wireless communication system by way of the RF interface 1104 and antenna 1106 requesting a subscription to user Y's blog (block 1122). The user of SU 1100 uses the input device 1112 and display 1110 to initiate the processor 1102 to send the subscription request message.

After the subscription request message has been sent, the processor 1102 receives a subscription accept message from the wireless communication system by way of the antenna 1106 and the RF interface 1104 (block 1124). The subscription accept message indicates that the subscription request has been accepted. In addition, the subscription accept message further includes the blog I.D._Y of user Y's blog. After receiving the subscription accept message, the processor 1102 stores the blog I.D._Y in memory 1108 for further use in receiving notifications of messages posted on user Y's blog and in retrieving those messages (block 1126).

FIG. 11C illustrates a flow diagram of an exemplary method 1130 of receiving a notification of the posting of a message by the exemplary subscriber unit 1100 in accordance with another embodiment of the invention. The SU 1100, now having a subscription to user Y's blog, can now receive notifications of the posting of messages on user Y's blog webpage. In this regard, the processor 1102 receives a call alert including the blog I.D._Y from the wireless communication system by way of the antenna 1106 and the RF interface 1104 (block 1132). The processor 1102 maps the blog I.D._Y to user Y, and notifies the user of SU 1100 using the display 1110 and/or speaker 1114 that a recent message has been posted on user Y's blog webpage (block 1134).

FIG. 11D illustrates a flow diagram of another exemplary method 1140 of receiving a notification of the posting of a message in accordance with another embodiment of the invention. According to the method 1140, once the SU 1100 has subscribed to user Y's blog service, it can now receive notifications of the posting of messages on user Y's blog webpage. In this regard, the processor 1102 sends the appropriate message to the wireless communication system by way of the RF interface 1104 and antenna 1106 to assist in the setting up of a dispatch communication link (block 1148).

The processor 1102 then receives a dispatch multimedia communication from the wireless communication system by way of the antenna 1106 and RF interface 1104 (block 1150). The dispatch multimedia communication includes an audio message notifying the user of the posting of a message on user Y's blog. The processor 1102, which may include a digital-to-analog (DAC) converter, converts the digital audio message into analog, and then sends the analog audio message to the speaker 1114 to allow the user to hear the message. It shall be understood that the subscriber unit 1100 may receive the notification via another type of dispatch multimedia communication, such as a text, image and/or video.

After the user is notified of the posting of the message, the processor 1102 receives the appropriate messages from the wireless communication system by way of the RF interface

1104 and antenna 1106 indicating the termination of the dispatch communication link (block 1152).

FIG. 11E illustrates a flow diagram of an exemplary method 1160 of retrieving a message posted on user Y's blog in accordance with another embodiment of the invention. According to the method 1160, the processor 1102 sends a call alert to the wireless communication system by way of the RF interface 1104 and the antenna 1106 (block 1162). The call alert includes the blog I.D._Y of user Y's blog. In response to receiving the notification received from the dispatch server, the processor 1102 then sends the appropriate message to the wireless communication system by way of the RF interface 1104 and antenna 1106 to establish a dispatch communication link (block 1164).

The processor 1102 then receives a dispatch multimedia communication from the wireless communication system by way of the antenna 1106 and RF interface 1104 (block 1166). The dispatch multimedia communication includes an audio of the message posted on user Y's blog. The processor 1102, which may include a digital-to-analog (DAC) converter, converts the digital audio message into analog, and then sends the analog audio message to the speaker 1114 to allow the user to hear the message. It shall be understood that the subscriber unit 1100 may receive the message via another type of dispatch multimedia communication, such as a text, image and/or video. The processor 1102 also receives the appropriate messages from the wireless communication system by way of the RF interface 1104 and antenna 1106 indicating the termination of the dispatch communication link (block 1168).

FIG. 11F illustrates a flow diagram of another exemplary method 1170 of retrieving a message posted on user Y's blog in accordance with another embodiment of the invention. According to the method 1170, the processor 1102 sends the appropriate message to the wireless communication system by way of the RF interface 1104 and antenna 1106 to establish a dispatch communication link (block 1172).

The user of the SU 1100 speaks into the microphone 1116 to provide the processor 1102 an audio message containing information related to the identity of user Y's blog (block 1174). The processor 1102 may include an analog-to-digital (ADC) converter to convert the analog audio signal generated by the microphone 1116 into a digital audio signal. The processor 1102 then sends a dispatch multimedia communication to the wireless communication system by way of the RF interface 1104 and the antenna 1106 (block 1174). The dispatch multimedia communication includes the audio message containing the identity of user Y's blog. It shall be understood that the subscriber unit 1100 may send the message via another type of dispatch multimedia communication, such as a text, image and/or video.

After the dispatch multimedia communication has been sent, the processor 1102 receives a dispatch multimedia communication from the wireless communication system by way of the antenna 1106 and RF interface 1104 (block 1176). The dispatch multimedia communication includes an audio message of the message posted on user Y's blog. The processor 1102, which may include a digital-to-analog (DAC) converter, converts the digital audio message into analog, and then sends the analog audio message to the speaker 1114 to allow the user to hear the message. It shall be understood that the subscriber unit 1100 may receive the notification via another type of dispatch multimedia communication, such as a text, image and/or video. The processor 1102 also receives the appropriate message from the wireless communication system by way of the RF interface 1104 and antenna 1106 indicating the termination of the dispatch communication link (block 1178).

FIG. 11G illustrates a flow diagram of an exemplary method 1180 of posting a message on a blog webpage by the exemplary subscriber unit 1100 in accordance with another embodiment of the invention. According to the method, the processor 1102 sends one or more messages (e.g., a CALL Req.) to a wireless communication system to establish a dispatch communication link with a dispatch server (block 1182). The one or more messages contain information that informs the dispatch server that the instant communication is for blog message posting application. Such information may include an IP address, UFMI, a SIP URI, Tel URI, or an E.164.

After the dispatch communication link is established, the processor 1102 sends a dispatch multimedia communication containing the message to be posted on the blog webpage to the dispatch server via the dispatch communication link (block 1184). In this regard, the user activates the input device 1112 and may speak into the microphone 1116 (if the multimedia is audio) to provide the processor 1102 the audio message. The processor 1102, which may include an analog-to-digital (ADC) converter, converts the analog audio message to a digital audio message. The processor 1102 then prepares and transmits the dispatch multimedia (e.g., digital audio) communication to the dispatch server by way of the RF interface 1104 and antenna 1106. After the dispatch multimedia communication has been sent to the dispatch server, the processor 1102 sends one or more messages (e.g., a FLOOR Avail) to begin the process of terminating the dispatch communication link to the dispatch server (block 1186).

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

It is claimed:

1. A web logging server, comprising:
   a network interface; and
   a hardware processor adapted to:
   receive a request by way of a dispatch server and said network interface from a requesting entity for a message in a text, audio, image and/or video format form posted on a web logging webpage;
   access said message; and
   send said message to said requesting entity by way of said network interface and said dispatch server.

2. The web logging server of claim 1, wherein said processor is adapted to send said message to said requesting entity also by way of a wireless communication system.

3. The web logging server of claim 1, wherein said request includes a message filtering parameter, and wherein said processor accesses said message in accordance with said message filtering parameter.

4. The web logging server of claim 1, wherein said request includes an address associated with said webpage.

5. The web logging server of claim 4, further comprising a memory for storing said message; and wherein said processor is adapted to retrieve said message from said memory using said address.

6. The web logging server of claim 1, wherein said processor is adapted to attempt to authenticate said request for said message before sending said message to the requesting entity.

7. The web logging server of claim 6, wherein said processor is adapted to attempt to authenticate the request by performing a query for credential information related to the requesting entity stored in a local memory or external server.

8. The web logging server of claim 6, wherein said processor is adapted to attempt to authenticate the request by sending an approval request to an entity managing said webpage.

9. A method, comprising:
receiving a request from a requesting entity by way of a dispatch server for a message in a text, audio, image and/or video format posted on a web logging webpage;
accessing said message; and
sending said message to said requesting entity by way of said dispatch server.

10. The method of claim 9, wherein sending said message comprises sending said message to said requesting entity also by way of a wireless communication system.

11. The method of claim 9, wherein said request includes a message filtering parameter, and further comprising accessing said message in accordance with said message filtering parameter.

12. The method of claim 9, wherein said request includes an address associated with said webpage.

13. The method of claim 12, wherein accessing said message comprises using said address to access said message.

14. The method of claim 9, further comprising attempting to authenticate said request for said message before sending said message to the requesting entity.

15. The method of claim 14, wherein attempting to authenticate the request comprises by performing a query for credential information related to the requesting entity stored in a local memory or external server.

16. The method of claim 14, wherein attempting to authenticate the request comprises sending an approval request to an entity managing said webpage.

17. A non-transitory computer readable medium comprising one or more software modules adapted to control a processor to:
receive a request from a requesting entity by way of a dispatch server for a message in a text, audio, image and/or video format posted on a webpage;
access said message from a memory; and
send said message to said requesting entity by way of said dispatch server.

18. The computer readable medium of claim 17, wherein said one or more software modules are adapted to control said processor to send said message to said requesting entity also by way of a wireless communication system.

19. The computer readable medium of claim 17, wherein said request includes a message filtering parameter, and wherein said one or more software modules are adapted to control said processor to access said message in accordance with said message filtering parameter.

20. The computer readable medium of claim 17, wherein said request includes an address associated with said webpage.

21. The computer readable medium of claim 20, wherein said one or more software modules are adapted to control said processor to retrieve said message from said memory using said address.

22. The computer readable medium of claim 17, wherein said one or more software modules are adapted to control said processor to attempt to authenticate said request for said message before sending said message to the requesting entity.

23. The computer readable medium of claim 22, wherein said one or more software modules are adapted to control said processor to attempt to authenticate the request by performing a query for credential information related to the requesting entity stored in a local memory or external server.

24. The computer readable medium of claim 22, wherein said one or more software modules are adapted to control said processor to attempt to authenticate the request by sending an approval request to an entity managing said webpage.

* * * * *